United States Patent [19]
Gosselink et al.

[11] Patent Number: 6,071,871
[45] Date of Patent: Jun. 6, 2000

[54] COTTON SOIL RELEASE POLYMERS

[75] Inventors: Eugene Paul Gosselink, Cincinnati; Kenneth Nathan Price, Wyoming, both of Ohio

[73] Assignee: The Procter & Gamble Company, Cincinnati, Ohio

[21] Appl. No.: 09/356,239

[22] Filed: Jul. 16, 1999

Related U.S. Application Data

[63] Continuation-in-part of application No. 09/180,191, filed as application No. PCT/US97/06917, Apr. 25, 1997
[60] Provisional application No. 60/016,807, May 3, 1996.
[51] Int. Cl.[7] .................................................. C11D 3/37
[52] U.S. Cl. .......................... 510/400; 510/405; 510/499; 510/504; 510/517; 510/528; 510/367; 510/286
[58] Field of Search ...................................... 510/400, 405, 510/499, 504, 517, 528, 367, 286

[56] References Cited

U.S. PATENT DOCUMENTS 5,565,145  10/1996  Watson et al. .......................... 510/350
5,747,440   5/1998  Kellett et al. ........................... 510/276

*Primary Examiner*—Mark Kopec
*Assistant Examiner*—Charles Boyer
*Attorney, Agent, or Firm*—Richard S. Echler, Sr.; Kim William Zerby; Jacobus C. Rasser

[57] ABSTRACT

Cotton soil release polymers comprising water soluble and/or dispersible, modified polyamines having functionalized backbone moieties and improved stability toward bleach. Also, laundry detergent compositions comprising these cotton soil release polymers having enhanced hydrophilic soil removal benefits.

17 Claims, No Drawings

COTTON SOIL RELEASE POLYMERS

CROSS REFERENCE

This Application is a Continuation-In-Part of application Ser. No. 09/180,191 filed Nov. 3, 1998 and Provisional Application Ser. No. 60/016,807 filed May 3, 1996 and a national stage of PCT/US97/06917 filed Apr. 25, 1997.

FIELD OF THE INVENTION

The present invention relates to cotton soil release polymers comprising water soluble and/or dispersible, modified polyamines having functionalized backbone moieties and improved stability toward bleach. The present invention also relates to laundry detergent compositions comprising cotton soil release polymers and to methods for laundering cotton articles. The present invention further relates to the surprising discovery that the combination of certain zwitterionic polyamines and a surfactant system provides for laundry detergent compositions having enhanced soil removal, especially clay soil, benefits.

BACKGROUND OF THE INVENTION

A wide variety of soil release agents for use in domestic and industrial fabric treatment processes such as laundering, fabric drying in hot air clothes dryers, and the like are known in the art. Various soil release agents have been commercialized and are currently used in detergent compositions and fabric softener/antistatic articles and compositions. Such soil release polymers typically comprise an oligomeric or polymeric ester "backbone".

Soil release polymers are generally very effective on polyester or other synthetic fabrics where the grease, oil or similar hydrophobic stains spread out and form a attached film and thereby are not easily removed in an aqueous laundering process. Many soil release polymers have a less dramatic effect on "blended" fabrics, that is on fabrics that comprise a mixture of cotton and synthetic material, and have little or no effect on cotton articles. The reason for the affinity of many soil release agents for synthetic fabric is that the backbone of a polyester soil release polymer typically comprises a mixture of terephthalate residues and ethyleneoxy or propyleneoxy polymeric units; the same or closely analogous to materials that comprise the polyester fibers or synthetic fabric. This similar structure of soil release agents and synthetic fabric produce an intrinsic affinity between these compounds.

Extensive research in this area has yielded significant improvements in the effectiveness of polyester soil release agents yielding materials with enhanced product performance and formulatability. Modifications of the polymer backbone as well as the selection of proper end-capping groups has produced a wide variety of polyester soil release polymers. For example, end-cap modifications, such as the use of sulfoaryl moieties and especially the low cost isethionate-derived end-capping units, have increased the range of solubility and adjunct ingredient compatibility of these polymers without sacrifice of soil release effectiveness. Many polyester soil release polymers can now be formulated into both liquid as well as solid (i.e., granular) detergents.

In contrast to the case of polyester soil release agents, producing an oligomeric or polymeric material that mimics the structure of cotton has not resulted in a cotton soil release polymer. Although cotton and polyester fabric are both comprised of long chain polymeric materials, they are chemically very different. Cotton is comprised of cellulose fibers that consist of anhydroglucose units joined by 1–4 linkages. The glycosidic linkages characterize the cotton cellulose as a polysaccharide whereas polyester soil release polymers are generally a combination of terephthalate and oxyethylene/oxypropylene residues. These differences in composition account for the difference in the fabric properties of cotton versus polyester fabric. Cotton is hydrophilic relative to polyester. Polyester is hydrophobic and attracts oily or greasy dirt and can easily be "dry cleaned". Importantly, the terephthalate and ethyleneoxy/propyleneoxy backbone of polyester fabric does not contain reactive sites, such as the hydroxyl moieties of cotton, that interact with stains in different manner than synthetics. Many cotton stains become "fixed" and can only be resolved by bleaching the fabric.

Until now the development of an effective cotton soil release agent for use in a laundry detergent has been elusive. Attempts by others to apply the paradigm of matching the structure of a soil release polymer with the structure of the fabric, a method successful in the polyester soil release polymer field, has nevertheless yielded marginal results when applied to cotton fabric soil release agents. The use of methylcellulose, a cotton polysaccharide with modified oligomeric units, proved to be more effective on polyesters than on cotton.

For example, U.K. 1,314,897, published Apr. 26, 1973 teaches a hydroxypropyl methyl cellulose material for the prevention of wet-soil redeposition and improving stain release on laundered fabric. While this material appears to be somewhat effective on polyester and blended fabrics, the disclosure indicates these materials to be unsatisfactory at producing the desired results on cotton fabric.

Other attempts to produce a soil release agent for cotton fabric have usually taken the form of permanently modifying the chemical structure of the cotton fibers themselves by reacting a substrate with the polysaccharide polymer backbone. For example, U.S. Pat. No. 3,897,026 issued to Kearney, discloses cellulosic textile materials having improved soil release and stain resistance properties obtained by reaction of an ethylenemaleic anhydride co-polymer with the hydroxyl moieties of the cotton polymers. One perceived drawback of this method is the desirable hydrophilic properties of the cotton fabric are substantially modified by this process.

Non-permanent soil release treatments or finishes have also been previously attempted. U.S. Pat. No. 3,912,681 issued to Dickson teaches a composition for applying a non-permanent soil release finish comprising a polycarboxylate polymer to a cotton fabric. However, this material must be applied at a pH less than 3, a process not suitable for consumer use nor compatible with laundry detergents which typically have a pH greater than 7.5

U.S. Pat. No. 3,948,838 issued to Hinton, et alia describes high molecular weight (500,000 to 1,500,000) polyacrylic polymers for soil release. These materials are used preferably with other fabric treatments, for example, durable press textile reactants such as formaldehyde. This process is also not readily applicable for use by consumers in a typical washing machine.

U.S. Pat. No. 4,559,056 issued to Leigh, et alia discloses a process for treating cotton or synthetic fabrics with a composition comprising an organopolysiloxane elastomer, an organosiloxaneoxyalkylene copolymer crosslinking agent and a siloxane curing catalyst. Organosilicone oligomers are well known by those skilled in the art as suds suppressors.

Other soil release agents not comprising terephthalate and mixtures of polyoxy ethylene/propylene are vinyl caprolactam resins as disclosed by Rupert, et alia in U.S. Pat. Nos. 4,579,681 and 4,614,519. These disclosed vinyl caprolactam materials have their effectiveness limited to polyester fabrics, blends of cotton and polyester, and cotton fabrics rendered hydrophobic by finishing agents.

Examples of alkoxylated polyamines and quaternized alkoxylated polyamines are disclosed in European Patent Application 206,513 as being suitable for use as soil dispersents, however their possible use as a cotton soil release agent is not disclosed. In addition, these materials do not comprise N-oxides, a key modification made to the polyamines of the present invention and a component of the increased bleach stability exhibited by the presently disclosed compounds.

It has now been surprisingly discovered that effective soil release agents for cotton articles can be prepared from certain modified polyamines. This unexpected result has yielded compositions that are effective at providing the soil release benefits once available to only synthetic and synthetic-cotton blended fabric.

The present invention provides for soil release agents that are effective on articles that comprise cotton as well as articles that comprise blends of cotton and certain synthetic fibers. The present invention also provides for laundry detergent compositions that are solid or liquid. The solid laundry detergents may be in the form of granules, flakes, pastes, gels or laundry bars. The liquid detergents can have a wide range of viscosity and may include heavy concentrates, pourable "ready" detergents, or light duty fabric pre-treatments.

The compounds of the present invention are compatible with other laundry detergent additives and adjuncts and when formulated with polyester soil release agents, now provide soil release on all fabrics.

BACKGROUND ART

In addition to the above cited art, the following disclose various soil release polymers or modified polyamines; U.S. Pat. No. 4,548,744, Connor, issued Oct. 22, 1985; U.S. Pat. No. 4,597,898, Vander Meer, issued Jul. 1, 1986; U.S. Pat. No. 4,877,896, Maldonado, et al., issued Oct. 31, 1989; U.S. Pat. No. 4,891,160, Vander Meer, issued Jan. 2, 1990; U.S. Pat. No. 4,976,879, Maldonado, et al., issued Dec. 11, 1990; U.S. Pat. No. 5,415,807, Gosselink, issued May 16, 1995; U.S. Pat. No. 4,235,735, Marco, et al., issued Nov. 25, 1980; U.K. Patent 1,537,288, published Dec. 29, 1978; U.K. Patent 1,498,520, published Jan. 18, 1978; WO 95/32272, published Nov. 30, 1995; German Patent DE 28 29 022, issued Jan. 10, 1980; Japanese Kokai JP 06313271, published Apr. 27, 1994.

SUMMARY OF THE INVENTION

It has been surprisingly found that certain polyamines, especially zwitterionic polyamines having a non-homogeneous backbone, when combined with a surfactant system, provides for enhanced soil removal benefits, particularly hydrophilic soil, inter alia, clay.

The present invention relates to laundry detergent compositions which comprise:

a) from about 0.01%, preferably from about 0.1% more preferably from about 1% to about 100%, preferably to about 80% by weight, preferably to about 60%, most preferably to about 30% by weight, of a surfactant system comprising one or more detersive surfactant selected from the group consisting of anionic, cationic, nonionic, zwitterionic, ampholytic surfactants, and mixtures thereof;

b) from about 0.01%, preferably from about 0.1%, more preferably from 1%, most preferably from 3% to about 20%, preferably to about 10%, more preferably to about 5% by weight of a water soluble or dispersible, modified polyamines which provides enhanced hydrophilic soil release benefits, comprising a polyamine backbone prior to modification corresponding to the formula:

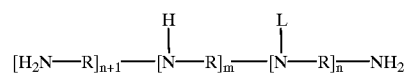

having a modified polyamine formula $V_{(n+1)}W_mY_nZ$ or a polyamine backbone prior to modification corresponding to the formula:

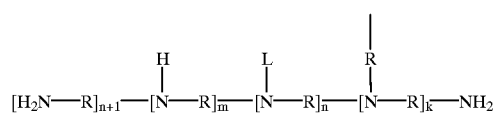

having a modified polyamine formula $V_{(n+1)}W_mY_nY'_kZ$, wherein k is less than or equal to n, said polyamine backbone prior to modification having a molecular weight greater than about 200 daltons, wherein i) V units are terminal units which have the formula:

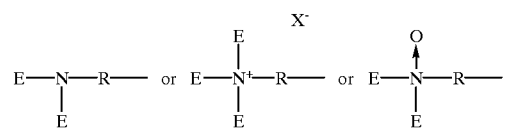

ii) W units are backbone units which have the formula:

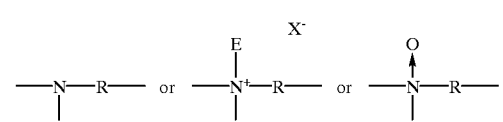

iii) Y units are branching units which have the formula:

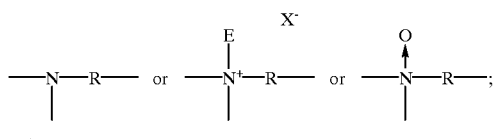

and iv) Z units are terminal units which have the formula:

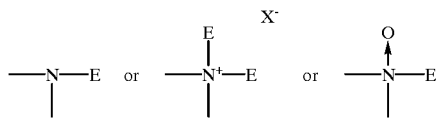

wherein L is a continuation of the backbone by branching, backbone linking R units are selected from the group consisting of
i) $C_2-C_{12}$ alkylene;
ii) $-(R^1O)_xR^3(OR^1)_x-$;
iii) $-CH_2CH(OR^2)CH_2-$;
iv) $-[CH_2CH(OR^2)CH_2(T)_r]_z(R^4)[CH_2CH(OR^2)CH_2(T)_r]_z-$
v) $-[CH_2CH(OR^2)CH_2(T)_r]_z(T)_r(R^1O)_x[CH_2CH(OR^2)CH_2(T)_r]_z(T)_r-$
vi) $-[CH_2CH(OR^2)CH_2](T)_r[C(O)(T)_rR^3(T)_rC(O)_x](T)_r-[CH_2CH(OR^2)CH_2](T)_r-$,
vii) and mixtures thereof; wherein T is $-O-$, $-NH-$, and mixtures thereof;

provided that when said backbone comprises a $C_2-C_{12}$ alkylene R unit at least one other R unit comprises said backbone; $R^1$ is $C_2-C_{12}$ alkylene, and mixtures thereof; $R^2$ is hydrogen, $-(R^1O)_xB$, and mixtures thereof; $R^3$ is $C_2-C_{12}$ alkylene, $C_3-C_{12}$ hydroxyalkylene, $C_4-C_{12}$ dihydroxyalkylene, $C_8-C_{12}$ dialkylarylene, $-C(O)-$, $-C(O)NHR^5NHC(O)-$, $R^1(OR^1)-$, and mixtures thereof; $R^4$ is $C_2-C_{12}$ alkylene, $C_4-C_{12}$ alkenylene, $C_8-C_{12}$ alkylarylene, $C_6-C_{10}$ arylene, and mixtures thereof; $R^5$ is $C_2-C_{12}$ alkylene or $C_6-C_{12}$ arylene; E units are selected from the group consisting of:
i) hydrogen;
ii) $C_1-C_{12}$ linear or branched alkyl;
iii) $C_2-C_{12}$ linear or branched alkenyl;
iv) $C_6-C_{10}$ aryl;
v) $C_7-C_{12}$ alkylenearyl;
vi) $-(CH_2)_pCO_2M$;
vii) $-CH(CH_2CO_2M)CO_2M$;
viii) $-(CH_2)_qSO_3M$;
ix) $-(CH_2)_qCH(SO_2M)CH_2SO_3M$;
x) $-(CH_2)_qCH(SO_3M)CH_2SO_3M$;
xi) $-(CH_2)_pPO_3M$;
xii) $-(R^1O)_xB$;

provided when any E unit of a nitrogen is a hydrogen, said nitrogen is not also an N-oxide; B is selected from the group consisting of:
i) hydrogen;
ii) $-(CH_2)_pCO_2M$;
iii) $-CH(CH_2CO_2M)CO_2M$;
iv) $-(CH_2)_qSO_3M$;
v) $-(CH_2)_qCH(SO_2M)CH_2SO_3M$;
vi) $-(CH_2)_qCH(SO_3M)CH_2SO_3M$;
vii) $-(CH_2)_pPO_3M$;
viii) and mixtures thereof;

M is hydrogen or a water soluble cation in sufficient amount to satisfy charge balance; X is a water soluble anion; k has the value from 0 to about 20; m has the value from 4 to about 400; n has the value from 0 to about 200; p has the value from 1 to 6, q has the value from 0 to 6; r has the value 0 or 1; w has the value 0 or 1; x has the value from 1 to 100; y has the value from 0 to 100; z has the value from 0 to 6; and
c) the balance carriers and adjunct ingredients.

All percentages, ratios and proportions herein are by weight, unless otherwise specified. All temperatures are in degrees Celsius (°C.) unless otherwise specified. All documents cited are in relevant part, incorporated herein by reference.

DETAILED DESCRIPTION OF THE INVENTION

The present invention relates to the surprising discovery that the combination of a polyamine, preferably zwitterionic polyamine having a non-homogeneous backbone and a surfactant system provides enhanced benefits for removal of clay soil from fabric especially clothing. It has been surprisingly discovered that the formulator, by selecting the relative degree of quaternization, oxidation, or quaternization/oxidation of the polyamine backbone, the type and relative degree of anionic units which substitute the polyamine backbone, and the nature of the amine backbone itself, is able to form a polymer which can be tailored for optimizing the hydrophilic soil removal benefits of the composition. For example, the formulator may opt to use one type of zwitterionic polymer for a liquid embodiment targeted for use in a high soil loading context and another zwitterionic polymer for use in a granular detergent used for washing fabric in cold water.

Preferably the non-homogeneous backbone comprising polyamines of the present invention have quaternized backbones and anionic units which have modified the backbone via substitution. The resulting zwitterionic polyamines are the preferred embodiments of the present invention. As described herein below, a key aspect of determining the properties of the polyamines of the present invention is the finding that the formulator, by adjusting the parameters $Q_f$, DQ, and Q(+), will be capable of customizing a polymer to formulate granular or liquid laundry detergent compositions having enhanced particulate soil removal benefits throughout a wide variety of settings, for example as a function of (1) the nature of the polymeric structure itself (e.g., EO level, MW, length and HLB of the amine backbone, etc.), (2) the detergent matrix (e.g., pH, type of surfactant, free hardness level), (3) the particular embodiment (e.g., granular, liquids, gel, structured liquid, tablet, non-aqueous, etc.), and (4) desired benefit (e.g., clay stain removal, whiteness, dingy cleaning, etc.). Therefore, in one desired embodiment the zwitterionic polymers of the present invention may have a $Q_r$ of from about 1 to about 2, whereas another embodiment will employ zwitterionic polymers having a $Q_r$ greater than 2. Specific embodiments, as described herein below, may require a $Q_r$ significantly less than 1 or even zero.

For the purposes of the present invention the term "charge ratio", $Q_r$, is defined herein as the "the quotient derived from dividing the sum of the number of anionic units present excluding counter ions by the sum of the number of cationic quaternary ammonium backbone units". The charge ratio is defined by the expression:

$$Q_r = \frac{\sum q_{anionic}}{\sum q_{cationic}}$$

wherein $q_{anionic}$ is an anionic unit, inter alia, —SO$_3$M, as defined herein below and $q_{cationic}$ represents a cationic quaternized backbone nitrogen. Quaternized nitrogen moieties with a net neutral charge such as N-oxide are not included in said definition of $q_{cationic}$.

For the purposes of the present invention the term "anionic character", DQ, is defined herein as "the sum of the number of anionic units which comprise the zwitterionic polymer minus the number of quaternary ammonium backbone units". The greater the excess number of anionic units, the greater the anionic character of the zwitterionic polymer. It will be recognized by the formulator that some anionic units may have more than one unit which has a negative charge. For the purposes of the present invention units having more than one negatively charged moiety, —CH$_2$CH (SO$_3$M)CH$_2$SO$_3$M, inter alia, will have each moiety capable of having a negative charge counted toward the sum of anionic units. The anionic character is defined by the expression:

$$\Delta Q = \Sigma q_{anionic} - \Sigma q_{cationic}$$

wherein $q_{anionic}$ and $q_{cationic}$ are the same as defined herein above.

Those of skill in the art will realize that the greater the number of amine units which comprise the polyamine backbones of the present invention the greater the number of potential cationic units will be contained therein. For the purposes of the present invention the term "degree of quaternization" is defined herein as "the number of backbone units which are quaternized divided by the number of backbone units which comprise the polyamine backbone". The degree of quaternization, Q(+), is defined by the expression:

$$Q(+) = \frac{\sum \text{quaternized backbone nitrogens}}{\sum \text{quaternizable backbone nitrogens}}$$

wherein a polyamine having all of the quaternizable backbone nitrogens quaternized will have a Q(+) equal to 1. For the purposes of the present invention the term "quaternizable nitrogen" refers to nitrogen atoms in the polyamine backbone which are capable of forming quaternary ammonium ions. This excludes nitrogens not capable of ammonium ion formation, inter alia, amides.

COTTON SOIL RELEASE POLYMERS

The water soluble or dispersible, modified cotton soil release polymers of the present invention which provide enhanced hydrophilic soil release benefits, comprise backbones that can be either linear or cyclic. The polyamine backbones can also comprise polyamine branching chains to a greater or lesser degree. In general, the polyamine backbones described herein are modified in such a manner that each nitrogen of the polyamine chain is thereafter described in terms of a unit that is substituted, quaternized, oxidized, or combinations thereof.

For the purposes of the present invention the term "modification" is defined as replacing a backbone —NH hydrogen atom by an E unit (substitution), quaternizing a backbone nitrogen (quaternized) or oxidizing a backbone nitrogen to the N-oxide (oxidized). The terms "modification" and "substitution" are used interchangeably when referring to the process of replacing a hydrogen atom attached to a backbone nitrogen with an E unit. Quaternization or oxidation may take place in some circumstances without substitution, but substitution must be accompanied by oxidation or quaternization of at least one backbone nitrogen.

The linear or non-cyclic polyamine backbones that comprise the cotton soil release agents of the present invention have the general formula:

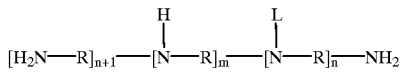

said backbones prior to subsequent modification, comprise primary, secondary and tertiary amine nitrogens connected by R "linking" units. The cyclic polyamine backbones comprising the cotton soil release agents of the present invention have the general formula:

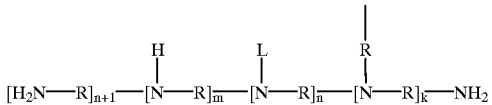

said backbones prior to subsequent modification, comprise primary, secondary and tertiary amine nitrogens connected by R "linking" units and L represents a continuation of the backbone by branching.

For the purpose of the present invention, primary amine nitrogens comprising the backbone or branching chain once modified are defined as V or Z "terminal" units. For example, when a primary amine moiety, located at the end of the main polyamine backbone or branching chain having the formula:

is modified according to the present invention, it is thereafter defined as a V "terminal" unit, or simply a V unit. However, for the purposes of the present invention, some or all of the primary amine moieties can remain unmodified subject to the restrictions further described herein below. These unmodified primary amine moieties by virtue of their position in the backbone chain remain "terminal" units. Likewise, when a primary amine moiety, located at the end of the main polyamine backbone having the formula:

is modified according to the present invention, it is thereafter defined as a Z "terminal" unit, or simply a Z unit. This unit can remain unmodified subject to the restrictions further described herein below.

In a similar manner, secondary amine nitrogens comprising the backbone or branching chain once modified are defined as W "backbone" units. For example, when a secondary amine moiety, the major constituent of the backbones and branching chains of the present invention, having the formula:

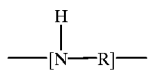

is modified according to the present invention, it is thereafter defined as a W "backbone" unit, or simply a W unit. However, for the purposes of the present invention, some or all of the secondary amine moieties can remain unmodified, but according to the present invention some backbone units must be modified. These unmodified secondary amine moieties by virtue of their position in the backbone chain remain "backbone" units.

In a further similar manner, tertiary amine nitrogens comprising the backbone or branching chain once modified are further referred to as Y "branching" units. For example, when a tertiary amine moiety, which is a chain branch point of either the polyamine backbone or other branching chains or rings, having the formula:

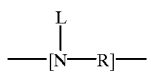

is modified according to the present invention, it is thereafter defined as a Y "branching" unit, or simply a Y unit. However, for the purposes of the present invention, some or all or the tertiary amine moieties can remain unmodified. These unmodified tertiary amine moieties by virtue of their position in the backbone chain remain "branching" units. The R units associated with the V, W and Y unit nitrogens which serve to connect the polyamine nitrogens, are described herein below.

The final modified structure of the polyamines of the present invention can be therefore represented by the general formula $$V_{(n+1)}W_m Y_n Z$$

for linear or branched polyamine cotton soil release polymers and by the general formula $$V_{(n-k+1)}W_m Y_n Y'_k Z$$

for cyclic polyamine cotton soil release polymers. For the case of polyamines comprising rings a Y' unit of the formula

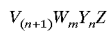

serves as a branch point for a backbone or branch ring. Except in the cases wherein the backbone comprises a ring, then for every Y' unit there is a Y unit having the formula:

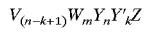

that will form the connection point of the ring to the main polymer chain or branch. In the unique case where the backbone is a complete ring, the polyamine backbone has the formula

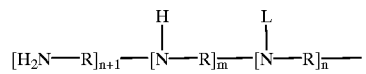

therefore comprising no Z terminal unit and having the formula $$V_{n-k}W_m Y_n Y'_k$$

wherein k is the number of ring forming branching units.

In the case of non-cyclic polyamines, the ratio of the index n to the index m relates to the relative degree of branching. A fully non-branched linear modified polyamine according to the present invention has the formula $$VW_m Z$$

that is, n is equal to 0. The greater the value of n (the lower the ratio of m to n), the greater the degree of branching in the molecule. Typically the value for m ranges from a minimum value of 4 to about 400, however larger values of m, especially when the value of the index n is very low or nearly 0, are also preferred. As further defined herein below, when the ratio of m:n is approximately 2:1 m is preferably less than 200.

Each polyamine nitrogen whether primary, secondary or tertiary, once modified according to the present invention, is further defined as being a member of one of three general classes; simple substituted, quaternized or oxidized. Those polyamine nitrogen units not modified are classed into V, W, Y, or Z units depending on whether they are primary, secondary or tertiary nitrogens. That is ummodified primary amine nitrogens are V or Z units, unmodified secondary amine nitrogens are W units and unmodified tertiary amine nitrogens are Y units for the purposes of the present invention.

Modified primary amine moieties are defined as V "terminal" units having one of three forms:

a) simple substituted units having the structure:

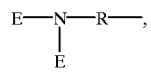

b) quaternized units having the structure:

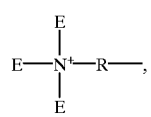

wherein X is a suitable counter ion providing charge balance; and c) oxidized units having the structure:

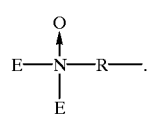

Modified secondary amine moieties are defined as W "backbone" units having one of three forms:

a) simple substituted units having the structure:

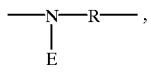

b) quaternized units having the structure:

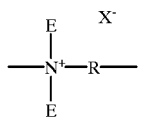

wherein x is a suitable counter ion providing charge balance; and c) oxidized units having the structure:

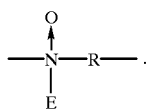

Modified tertiary amine moieties are defined as Y "branching" units having one of three forms:

a) unmodified units having the structure:

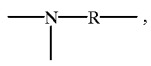

b) quaternized units having the structure:

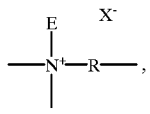

wherein X is a suitable counter ion providing charge balance; and c) oxidized units having the structure:

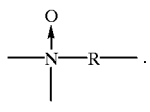

Certain modified primary amine moieties are defined as Z "terminal" units having one of three forms:

a) simple substituted units having the structure:

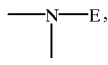

b) quaternized units having the structure:

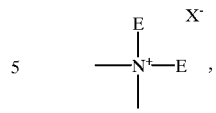

wherein X is a suitable counter ion providing charge balance; and c) oxidized units having the structure:

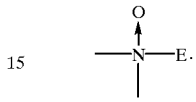

When any position on a nitrogen is unsubstituted of unmodified, it is understood that hydrogen will substitute for E. For example, a primary amine unit comprising one E unit in the form of a hydroxyethyl moiety is a V terminal unit having the formula $(HOCH_2CH_2)HN-$.

For the purposes of the present invention there are two types of chain terminating units, the V and Z units. The Z "terminal" unit derives from a terminal primary amino moiety of the structure $-NH_2$. Non-cyclic polyamine backbones according to the present invention comprise only one Z unit whereas cyclic polyamines can comprise no Z units. The Z "terminal" unit can be substituted with any of the E units described further herein below, except when the Z unit is modified to form an N-oxide. In the case where the Z unit nitrogen is oxidized to an N-oxide, the nitrogen must be modified and therefor E cannot be a hydrogen.

The polyamines of the present invention comprise backbone R units that serve to connect the nitrogen atoms of the backbone. R units are selected from the group consisting of:

i) $C_2$–$C_{12}$ alkylene;
ii) $-(R^1O)_xR^3(OR^1)_x-$;
iii) $-CH_2CH(OR^2)CH_2-$;
iv) $-[CH_2CH(OR^2)CH_2(T)_r]_z(R^4)[CH_2CH(OR^2)CH_2(T)_r]_z-$
v) $-[CH_2CH(OR^2)CH_2(T)_r]_z(T)_r(R^1O)_x[CH_2CH(OR^2)CH_2(T)_r]_z(T)_r-$
vi) $-[CH_2CH(OR^2)CH_2](T)_r[C(O)(T)_rR^3(T)_rC(O)_x](T)_r[CH_2CH(OR^2)CH_2](T)_r-$;
vii) and mixtures thereof;

wherein T is $-O-$, $-NH-$, and mixtures thereof.

For the purposes of the present invention R units are referred to as "hydrocarbyl R" units and "oxy R" units. The "hydrocarbyl" R units are $C_2$–$C_{12}$ alkylene, preferably ethylene, 1,2-propylene, and mixtures thereof, more preferably ethylene. The "oxy" R units comprise $-(R^1O)_xR^3(OR^1)_x-$; $-CH_2CH(OR^2)CH_2-$; $-[CH_2CH(OR^2)CH_2(T)_r]_z(R^4)-[CH_2CH(OR^2)CH_2(T)_r]_z-$; $-[CH_2CH(OR^2)CH_2(T)_r]_z(T)_r(R^1O)_x[CH_2CH(OR^2)CH_2(T)_r]_z(T)_r-$; $-[CH_2CH(OR^2)CH_2](T)_r[C(O)(T)_rR^3(T)_rC(O)_x](T)_r[CH_2CH(OR^2)CH_2](T)_r-$; and mixtures thereof. The backbone R units of the present invention must comprise at least one "oxy R" unit.

$R^1$ units are $C_2$–$C_{12}$ alkylene, and mixtures thereof; preferably ethylene, 1,2-propylene, 1,2-butylene, 1,2-hexylene, 1,6-hexylene.

$R^2$ is hydrogen, and —$(R^1O)_xB$, preferably hydrogen.

$R^3$ is $C_2$–$C_{12}$ alkylene, $C_3$–$C_{12}$ hydroxyalkylene, $C_4$–$C_{12}$ dihydroxyalkylene, $C_8$–$C_{12}$ dialkylarylene, —C(O)—, —C(O)NHR$^5$NHC(O)—, $R^1(OR^1)$—, and mixtures thereof; $R^3$ is preferably ethylene, —C(O)—, —C(O)NH R$^5$NHC(O)—, —$R^1(OR^1)$—, —$CH_2CH(OH)$ $CH_2$—, —$CH_2CH(OH)CH_2O(R^1O)_xR^1OCH_2CH(OH)CH_2$—, more preferably —$CH_2CH(OH)CH_2$—.

$R^4$ is $C_2$–$C_{12}$ alkylene, $C_4$–$C_{12}$ alkenylene, $C_8$–$C_{12}$ alkylarylene, $C_6$–$C_{10}$ arylene, and mixtures thereof; preferably $C_2$–$C_{10}$ alkylene, $C_8$–$C_{12}$ aryalkylene, more preferably $C_2$–$C_8$ alkylene, most preferably ethylene or butylene.

$R^5$ is $C_2$–$C_{12}$ alkylene or $C_6$–$C_{12}$ arylene.

The preferred R units of the present invention are backbone units which comprise only "oxy" R units or "hydrocarbyl" R units which comprise greater than 50% ethylene units. Preferably the R "hydrocarbyl" units which are present are absent ethylene units. Examples of preferred R units can be achieved by substituting preferred $R^1$, $R^2$, and $R^3$ units into the "oxy" R unit formulae, for example:

i) Substituting more preferred $R^3$ into —$(CH_2CH_2O)_xR^3(OCH_2CH_2)_x$— yields a unit having the formula —$(CH_2CH_2O)_xCH_2CHOHCH_2(OCH_2CH_2)_x$—.

ii) Substituting preferred $R^1$ and $R^2$ into —$(CH_2CH(OR^2)CH_2O)_z(R^1O)_y$—$R^1O(CH_2CH(OR^2)CH_2)_w$— yields a unit having the formula —$(CH_2CH(OH)CH_2O)_z(CH_2CH_2O)_yCH_2CH_2O(CH_2CH(OH)CH_2)_w$—.

iii) Substituting preferred $R^2$ into —$CH_2CH(OR^2)CH_2$— yields a unit having the formula —$CH_2CH(OH)CH_2$—.

E units are selected from the group consisting of:
i) hydrogen;
ii) $C_1$–$C_{12}$ linear or branched alkyl;
iii) $C_2$–$C_{12}$ linear or branched alkenyl;
iv) $C_6$–$C_{10}$ aryl;
v) $C_7$–$C_{12}$ alkylenearyl;
vi) —$(CH_2)_pCO_2M$;
vii) —$CH(CH_2CO_2M)CO_2M$;
viii) —$(CH_2)_qSO_3M$;
ix) —$(CH_2)_qCH(SO_2M)CH_2SO_3M$;
x) —$(CH_2)_qCH(SO_3M)CH_2SO_3M$;
xi) —$(CH_2)_pPO_3M$;
xii) —$(R^1O)_xB$.

E units are preferably —$(R^1O)_xB$, —$(CH_2)_pCO_2M$, —$(CH_2)_qSO_3M$, —$CH(CH_2CO_2M)CO_2M$, more preferably —$(R^1O)_xB$. When no modification or substitution is made on a nitrogen then hydrogen atom will remain as the moiety representing E.

E units do not comprise hydrogen atom when the V, W or Z units are oxidized, that is the nitrogens are N-oxides. For example, the backbone chain or branching chains do not comprise units of the following structure:

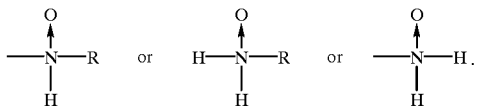

B is selected from the group consisting of:
i) hydrogen;
ii) —$(CH_2)_pCO_2M$;
iii) —$CH(CH_2CO_2M)CO_2M$;
iv) —$(CH_2)_qSO_3M$;
v) —$(CH_2)_qCH(SO_2M)CH_2SO_3M$;
vi) —$(CH_2)_qCH(SO_3M)CH_2SO_3M$;
vii) —$(CH_2)_pPO_3M$;
viii) and mixtures thereof.

Preferably B is hydrogen, —$(CH_2)_qSO_3M$, —$(CH_2)_qCH(SO_3M)CH_2SO_3M$, —$(CH_2)_qCH(SO_2M)CH_2SO_3M$; more preferably hydrogen or —$(CH_2)_qSO_3M$.

M is hydrogen or a water soluble cation in sufficient amount to satisfy charge balance. For example, a sodium cation equally satisfies —$(CH_2)_pCO_2M$, and —$(CH_2)_qSO_3M$, thereby resulting in —$(CH_2)_pCO_2Na$, and —$(CH_2)_qSO_3Na$ moieties. More than one monovalent cation, (sodium, potassium, etc.) can be combined to satisfy the required chemical charge balance. However, more than one anionic group may be charge balanced by a divalent cation, or more than one mono-valent cation may be necessary to satisfy the charge requirements of a poly-anionic radical. For example, a —$(CH_2)_pPO_3M$ moiety substituted with sodium atoms has the formula —$(CH_2)_pPO_3Na_2$. Divalent cations such as calcium ($Ca^{2+}$) or magnesium ($Mg^{2+}$) may be substituted for or combined with other suitable mono-valent water soluble cations. Preferred cations are sodium and potassium, more preferred is sodium.

X is a water soluble anion such as chlorine ($Cl^-$), bromine ($Br^-$) and iodine ($I^-$) or X can be any negatively charged radical such as sulfate ($SO_4^{2-}$), methosulfate ($CH_3OSO_3^-$), and methanesulfonate ($CH_3SO_3^-$).

The formula indices have the following values: p has the value from 1 to 6; q has the value from 0 to 6; r has the value 0 or 1; w has the value 0 or 1; x has the value from 1 to 100; y has the value from 0 to 100; z has the value 0 or 1; k has the value from 0 to about 20; m has the value from 0 to about 400; n has the value from 0 to about 200.

An example of a polyamine backbone according to the present invention prior to modification has the formula

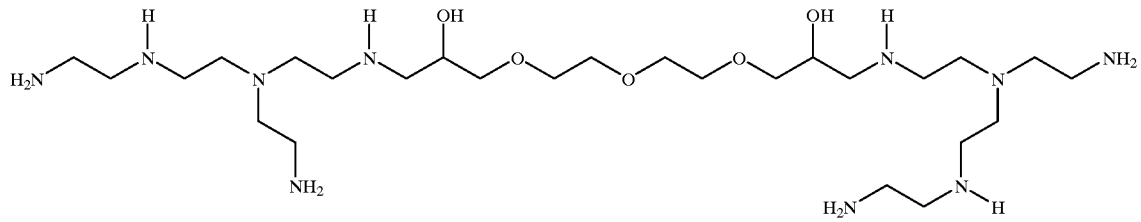

wherein 8 R units comprise ethylene units and a 1 R unit comprises a

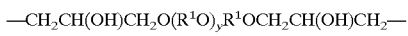

moiety wherein $R^1$ is ethylene and y is equal to 1.

A further example of a polyamine backbone prior to modification that is suitable for use as a cotton soil release agent according to the present invention has the formula

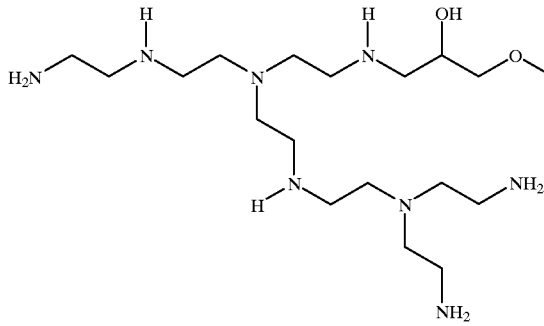

wherein 12 R units comprise ethylene units and 1 R unit comprises a

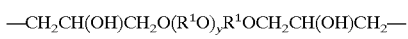

moiety wherein $R^1$ is ethylene and y is equal to 1. Structures similar to these two examples given above are for the purposes of the present invention commonly referred to as "blocks". Typically several blocks are combined to form the final backbone prior to modification.

As in the examples above, polyethyleneimines (PEI's) and polyethyleneamines (PEA's) of low molecular weight, typically below 600 daltons, are linked together using the "oxy" R units which serve as convenient coupling agents. Depending on the desired properties of the final cotton soil release agent (e.g., solubility, fabric substantivity) a lesser or greater degree of "oxy" R units will comprise the polyamine backbone.

It is more convenient for nitrogen modification to occur after complete assembly of the polyamine backbone. However the formulator may wish to have a polymer backbone with a high degree of unmodified nitrogen atoms. This can be accomplished by premodifying some or all the polyalkyleneimine or polyalkyleneamine "hydrocarbyl" portion of the backbone prior to linking via "oxy" R units.

An example of a procedure that allows for a mixture of modified and unmodified blocks in the cotton soil release polymer, comprises the steps of i) modifying a polyethyleneimine having, for example, the formula:

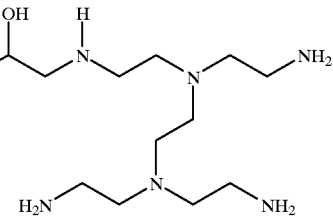

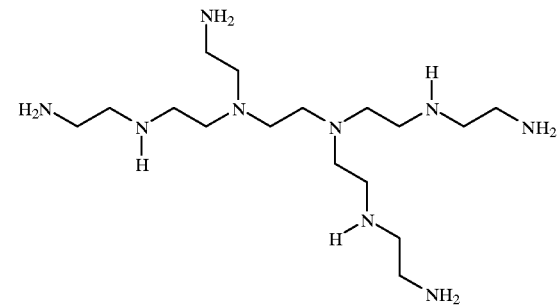

wherein the modification is
a) substitution of the —NH hydrogen atom by an E unit;
b) quaternization;
c) oxidation to the N-oxide; or
d) mixtures thereof;
resulting in an example modified polyethyleneimine having the formula:

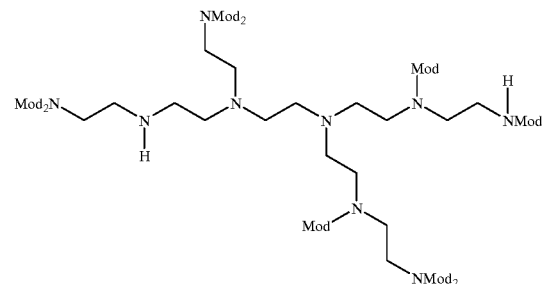

wherein Mod represents one or more modifications according to the present invention;
ii) the modified polyethyleneimine is coupled with a second molecule of the original unmodified polyethyleneimine through an —CH$_2$CH(OH)CH$_2$O—(R$^1$O)$_y$R$^1$OCH$_2$CH(OH)CH$_2$— moiety wherein $R^1$ is ethylene and y is equal to 1, to form a polyamine cotton soil release agent having the formula:

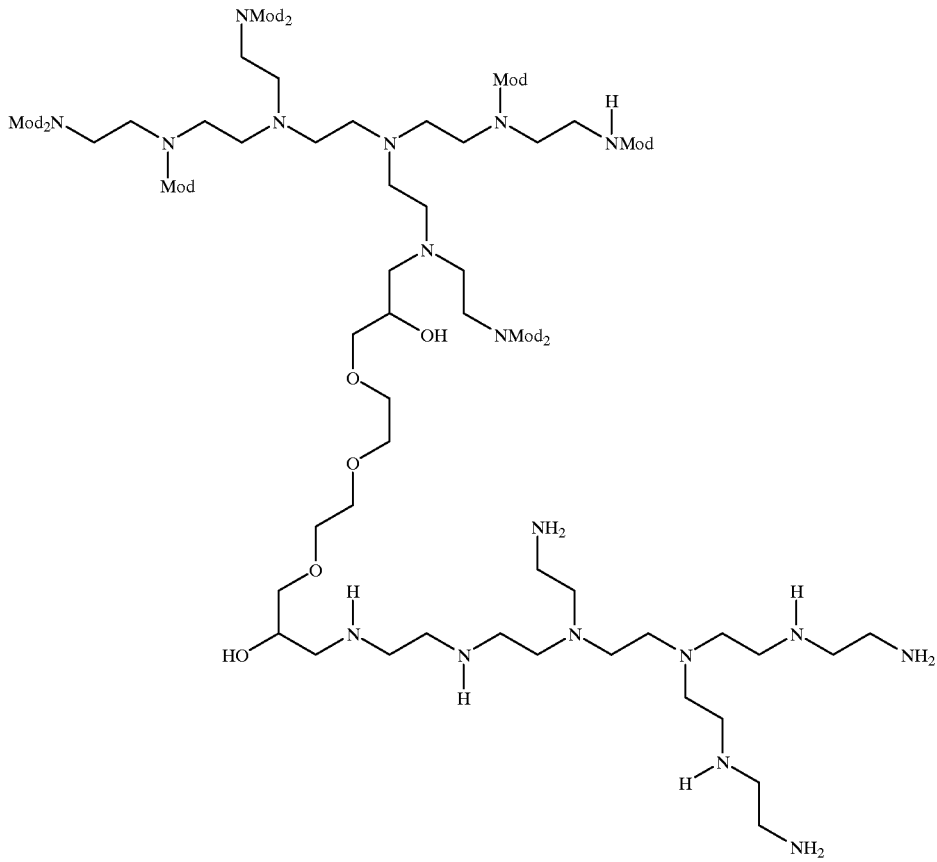

Once this process is completed, the above unit may be used "as is" or may be further coupled to one or more modified or un-modified blocks.

The preferred "blocks" of polyamines having "hydrocarbyl" R units that comprise the backbone of the compounds of the present invention are generally polyalkyleneamines (PAA's), polyalkyleneimines (PAI's), preferably polyethyleneamine (PEA's), polyethyleneimines (PEI's) units. An example of a polyalkylenamine (PAA) is tetrabutylenepentamine. PEA's are obtained by reactions involving ammonia and ethylene dichloride, followed by fractional distillation. The common PEA's obtained are triethylenetetramine (TETA) and teraethylenepentamine (TEPA). Above the pentamines, i.e., the hexamines, heptamines, octamines and possibly nonamines, the cogenerically derived mixture does not appear to separate by distillation and can include other materials such as cyclic amines and particularly piperazines. There can also be present cyclic amines with side chains in which nitrogen atoms appear. See U.S. Pat. No. 2,792,372, Dickinson, issued May 14, 1957, which describes the preparation of PEA's.

The PEI blocks which comprise the preferred backbones of the polyamines of the present invention can be prepared, for example, by polymerizing ethyleneimine in the presence of a catalyst such as carbon dioxide, sodium bisulfite, sulfuric acid, hydrogen peroxide, hydrochloric acid, acetic acid, etc. Specific methods for preparing PEI's are disclosed in U.S. Pat. No. 2,182,306, Ulrich et al., issued Dec. 5, 1939; U.S. Pat. No. 3,033,746, Mayle et al., issued May 8, 1962; U.S. Pat. No. 2,208,095, Esselmann et al., issued Jul. 16, 1940; U.S. Pat. No. 2,806,839, Crowther, issued Sep. 17, 1957; and U.S. Pat. No. 2,553,696, Wilson, issued May 21, 1951 (all herein incorporated by reference). In addition to the linear and branched PEI's, the present invention also includes the cyclic amines that are typically formed as artifacts or synthesis. The presence of these materials may be increased or decreased depending on the conditions chosen by the formulator.

Surprisingly it has been discovered that certain polyamines, preferably zwitterionic polyamines provide enhanced soil removal from cotton fabric. Non-limiting examples of polyamine backbones are described herein below.

The following is an example of a polyamine backbone which comprises 2-hydroxypropyl units in combination with alkyleneoxy units.

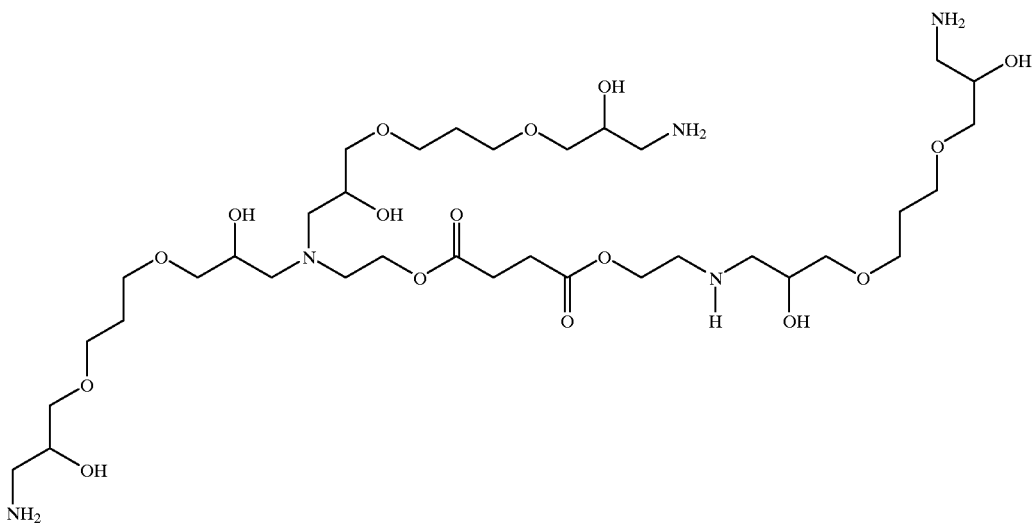
The following is a non-limiting example of a polyamine backbone which is fully quaternized.
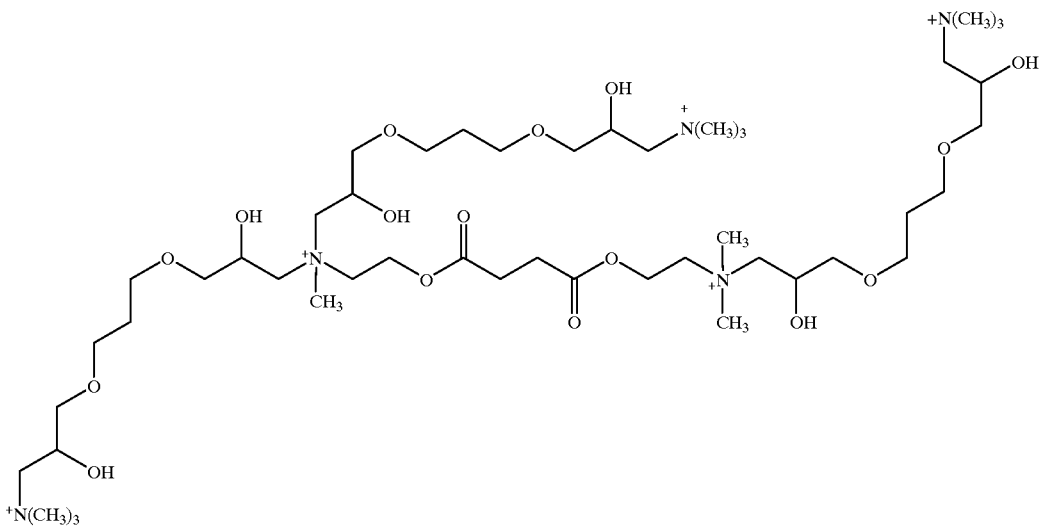
The following is a non-limiting example of a zwitterionic polyamine according to the present invention.

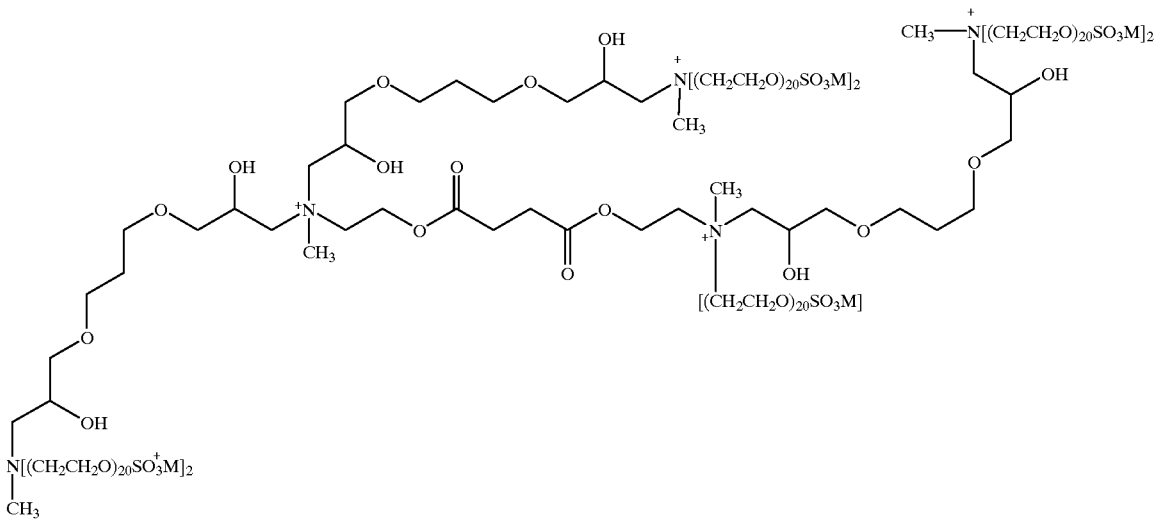

The zwitterionic polymers of the present invention preferably comprise polyamine backbone which are derivatives of two types of backbone units:

i) normal oligomers which comprise "hydrocarbyl" R units which are preferably polyamines having the formula:

wherein L is a continuation of the polyamine chain by branching, n is preferably 0, m is from 0 to 3, x is 2 to 8, preferably from 3 to 6; and ii) hydrophilic oligomers which comprise "oxy" R units which are preferably polyamines having the formula:

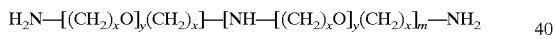

wherein m is from 0 to 3; each x is independently from 2 to 8, preferably from 2 to 6; y is preferably from 1 to 8.

Depending upon the degree of hydrophilic character needed in the zwitterionic backbones, the formulator may assemble higher oligomers from these constituent parts by using R units of types (i) or (ii). Non-limiting examples include the epihalohydrin condensate having the formula:

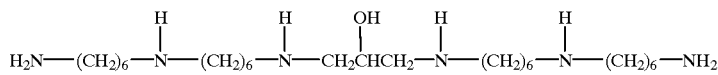

or the hybrid oligomer having the formula:

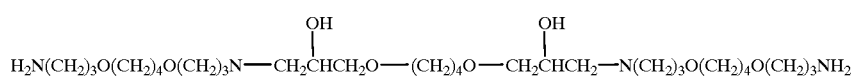

wherein each backbone comprises a mixture of R units.

A further example of polyamine backbones of the present invention which comprise 100% "oxy" moieties, for example, a polyamine backbone prior to modification comprising —$CH_2CH(OH)CH_2O(R^1O)_yR^1OCH_2CH(OH)CH_2$— R units wherein $R^1$ is ethylene and y is equal to 1, has the formula

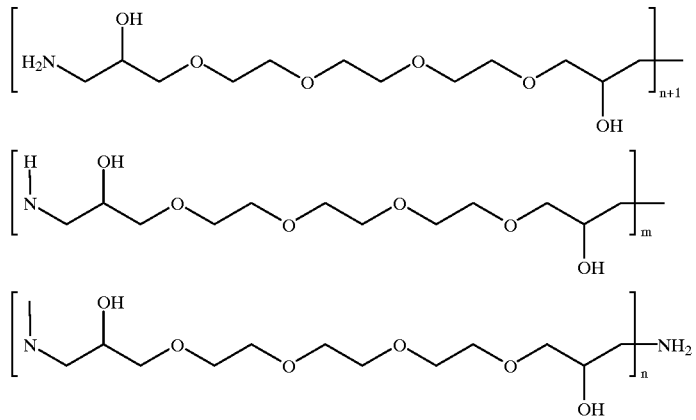

As described herein before, the formulator may form zwitterionic polymers which have an excess of charge ($Q_r$ less than 1 or greater than 1) or an equivalent amount of charge type ($Q_r$ equal to 1). An example of a preferred zwitterionic polyamine according to the present invention which has an excess of anionic charged units, $Q_r$ equal to 2, has the formula:

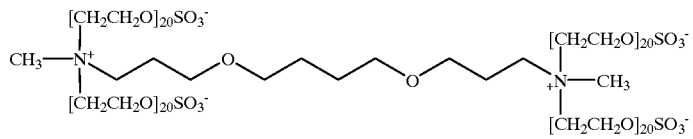

wherein R is a 1,3-propyleneoxy-1,4-butyleneoxy-1,3-propylene unit, w is 2; E is —$(R^1O)_xB$ and methyl, wherein $R^1$ is ethylene, each B is —$SO_3^-$, Q is methyl, x is 20. For zwitterionic polyamines of the present invention, it will be recognized by the formulator that not every E unit will have a —$SO_3^-$ moiety capping said E unit. For the above example, the final zwitterionic polyamine mixture comprises at least about 90% B units which are —$SO_3^-$ units.

EXAMPLE 1

Preparation of 4,9-dioxa-1,12-dodecanediamine, ethoxylated to average E20 per NH, quaternized to 90%, and sulfated to 90%

Ethoxylation of 4,9-dioxa-1,12-dodecanediamine to an average of 20 ethoxylations per backbone NH unit The ethoxylation is conducted in a 2 gallon stirred stainless steel autoclave equipped for temperature measurement and control, pressure measurement, vacuum and inert gas purging, sampling, and for introduction of ethylene oxide as a liquid. A ~20 lb. net cylinder of ethylene oxide is set up to deliver ethylene oxide as a liquid by a pump to the autoclave with the cylinder placed on a scale so that the weight change of the cylinder can be monitored. A 200 g portion of 4,9-dioxa-1,12-dodecanediamine ("DODD", m.w. 204.32, 97%, 0.95 moles, 1.9 moles N, 3.8 moles ethoxylatable NH's) is added to the autoclave. The autoclave is then sealed and purged of air (by applying vacuum to minus 28" Hg followed by pressurization with nitrogen to 250 psia, then venting to atmospheric pressure). The autoclave contents are heated to 80° C. while applying vacuum. After about one hour, the autoclave is charged with nitrogen to about 250 psia while cooling the autoclave to about 105° C. Ethylene oxide is then added to the autoclave incrementally over time while closely monitoring the autoclave pressure, temperature, and ethylene oxide flow rate. The ethylene oxide pump is turned off and cooling is applied to limit any temperature increase resulting from any reaction exotherm. The temperature is maintained between 100 and 110° C. while the total pressure is allowed to gradually increase during the course of the reaction. After a total of 167 grams of ethylene oxide (3.8 moles) has been charged to the autoclave, the temperature is increased to 110° C. and the autoclave is allowed to stir for an additional 2 hours. At this point, vacuum is applied to remove any residual unreacted ethylene oxide.

Vacuum is continuously applied while the autoclave is cooled to about 50° C. while introducing 41 g of a 25% sodium methoxide in methanol solution (0.19 moles, to achieve a 10% catalyst loading based upon DODD nitrogen functions). The methoxide solution is removed from the autoclave under vacuum and then the autoclave temperature controller setpoint is increased to 100° C. A device is used to monitor the power consumed by the agitator. The agitator power is monitored along with the temperature and pressure. Agitator power and temperature values gradually increase as methanol is removed from the autoclave and the viscosity of the mixture increases and stabilizes in about 1.5 hours indicating that most of the methanol has been removed. The mixture is further heated and agitated under vacuum for an additional 30 minutes.

Vacuum is removed and the autoclave is cooled to 105° C. while it is being charged with nitrogen to 250 psia and then vented to ambient pressure. The autoclave is charged to 200 psia with nitrogen. Ethylene oxide is again added to the autoclave incrementally as before while closely monitoring the autoclave pressure, temperature, and ethylene oxide flow rate while maintaining the temperature between 100 and 110° C. and limiting any temperature increases due to reaction exotherm. After the addition of 3177 g of ethylene oxide (72.2 mol, resulting in a total of 20 moles of ethylene oxide per mole of ethoxylatable sites as DODD), the temperature is increased to 110° C. and the mixture stirred for an additional 2 hours.

The reaction mixture is then collected into a 22 L three neck round bottomed flask purged with nitrogen. The strong alkali catalyst is neutralized by slow addition of 18.2 g methanesulfonic acid (0.19 moles) with heating (100° C.) and mechanical stirring. The reaction mixture is then removed of residual ethylene oxide and deodorized by sparging an inert gas (argon or nitrogen) into the mixture through a gas dispersion frit while agitating and heating the mixture to 120° C. for 1 hour. The final reaction product is cooled slightly and stored in a glass container purged with nitrogen.

Quaternization of 4,9-dioxa-1,12-dodecanediamine which is ethoxylated to an average of 20 ethoxylations per backbone NH unit. Into a weighed, 2000 ml, 3 neck round bottom flask fitted with argon inlet, condenser, addition funnel, thermometer, mechanical stirring and argon outlet (connected to a bubbler) is added DODD EO20 (561.2 g, 0.295 mol N, 98% active, m.w.—3724) and methylene chloride (1000 g) under argon. The mixture is stirred at room temperature until the polymer has dissolved. The mixture is then cooled to 5° C. using an ice bath. Dimethyl sulfate (39.5 g, 0.31 mol, 99%, m.w.—126.13) is slowly added using an addition funnel over a period of 15 minutes. The ice bath is removed and the reaction is allowed to rise to room temperature. After 48 hrs. The reaction is complete. Sulfation of 4,9-dioxa-1,12-dodecanediamine which is quaternized to about 90% of the backbone nitrogens of the product admixture and which is ethoxylated to an average of 20 ethoxylations per backbone NH unit. Under argon, the reaction mixture from the quaternization step is cooled to 5° C. using an ice bath (DODD EO20, 90+mol % quat, 0.59 mol OH). Chlorosulfonic acid (72 g, 0.61 mol, 99%, mw—116.52) is slowly added using an addition funnel. The temperature of the reaction mixture is not allowed to rise above 10° C. The ice bath is removed and the reaction is allowed to rise to room temperature. After 6 hrs., the reaction is complete. The reaction is again cooled to 5° C. and sodium methoxide (264 g, 1.22 mol, Aldrich, 25% in methanol, m.w.—54.02) is slowly added to the rapidly stirred mixture. The temperature of the reaction mixture is not allowed to rise above 10° C. The reaction mixture is transferred to a single neck round bottom flask. Purified water (1300 ml) is added to the reaction mixture and the methylene chloride, methanol and some water is stripped off on a rotary evaporator at 50° C. The clear, light yellow solution is transferred to a bottle for storage. The final product pH is checked and adjusted to ~9 using 1N NaOH or 1NHCl as needed. Final weight ~1753 g.

The polyamines of the present invention may develop undesirable off-colors due to impurities present as artifacts of their preparation or produced during processing or handling of the polyamines. In the case where the presence of color is unacceptable in the final formulation, the processor or formulator may apply one or more known procedures for "de-colorizing" the polyamines of the present invention. This de-colorizing may be accomplished at any stage in the processing of the polyamines disclosed herein, provided said processing does not limit or diminish the effectiveness of the final heavy metal ion control agents.

Treatment with activated charcoal in the presence of a suitable solvent is a common procedure for de-colorizing organic materials and may be applied to the polyamines of the present invention. Contact with silicates or diatomaceous earth are additional de-colorizing measures. Treatment with bleaching agents (e.g., hypohalites or peracids) also serves as a suitable method for de-colorizing the chelants of the present invention provided that once de-colorizing with a bleaching agent is accomplished, the formulator insures that little or no active bleaching agent is carried throughout to the formulation, as described in detail hereinafter.

The present invention also relates to laundry detergent compositions comprising:

a) at least 0.01% by weight, of a water-soluble or dispersible, bleach stable, modified polyamine cotton soil release agent of the present invention; and b) the balance carrier and adjunct ingredients.

Preferably the laundry detergent compositions of the present invention comprise:

a) at least 0.01% by weight, of a detersive surfactant selected from the group consisting of anionic, cationic, nonionic, zwitterionic, and ampholytic surfactants, and mixtures thereof;

b) from about 0.1 to about 10% by weight, a modified polyamine cotton soil release polymer according to the present invention; and c) the balance carrier and adjunct ingredients.

More preferably the laundry detergent compositions of the present invention comprise:

a) at least 0.01% by weight, of a detersive surfactant selected from the group consisting of anionic, cationic, nonionic, zwitterionic, and ampholytic surfactants, and mixtures thereof;

b) from about 0.01 to about 10% by weight, of a soil release polymer having effective soil release on non-cotton fabric;

c) optionally from about 0.05 to about 30% by weight, of a bleach;

d) from about 0.1 to about 10% by weight, a modified polyamine cotton soil release polymer according to the present invention; and e) the balance carrier and adjunct ingredients.

In the above more preferred embodiment what is meant by the term "effective soil release on non-cotton fabric" is that amount of polyester or cotton-polyester effective soil release agent which provides soil release benefits, typically at least from about 0.01% to about 10% by weight, is effective. Suitable non-cotton soil release agents are further described herein below.

The laundry detergent composition may be in any suitable form, for example, high density liquids, light liquids or other pourable forms in addition to granules or laundry bars. The cotton soil release polymers of the present invention can be formulated into any detersive matrix chosen by the formulator.

The laundry detergent compositions according to the present invention comprise adjunct ingredients and carriers, said adjunct ingredients are selected from the group consisting of builders, optical brighteners, bleaches, bleach boosters, bleach activators, soil release polymers, dye transfer agents, dispersents, enzymes, enzyme activators, suds suppressors, dyes, perfumes, colorants, filler salts, hydrotropes, and mixtures thereof, however this list is not meant to be exhaustive or to exclude any suitable material used by the formulator.

Detersive Surfactants

The detersive surfactants suitable for use in the present invention are cationic, anionic, nonionic, ampholytic, zwitterionic, and mixtures thereof, further described herein below. The laundry detergent composition may be in any suitable form, for example, high density liquids, light liquids or other pourable forms in addition to granules or laundry bars. The cotton soil release polymers of the present invention can be formulated into any detersive matrix chosen by the formulator.

The laundry detergent compositions according to the present invention comprise at least about 0.01%, preferably at least about 0.1%, more preferably at least about 1% by weight, of a detersive surfactant. Nonlimiting examples of surfactants useful herein typically at levels from about 1% to about 55%, by weight, include the conventional $C_{11}$–$C_{18}$ alkyl benzene sulfonates ("LAS") and primary, branched-chain and random $C_{10}$–$C_{20}$ alkyl sulfates ("AS"), the $C_{10}$–$C_{18}$ secondary (2,3) alkyl sulfates of the formula $CH_3(CH_2)_x(CHOSO_3^-M^+)CH_3$ and $CH_3(CH_2)_y(CHOSO_3^-M^+)CH_2CH_3$ where x and (y+1) are integers of at least about 7, preferably at least about 9, and M is a water-solubilizing cation, especially sodium, unsaturated sulfates such as oleyl sulfate, the $C_{10}$–$C_{18}$ alkyl alkoxy sulfates ("$AE_xS$"; especially EO 1–7 ethoxy sulfates), $C_{10}$–$C_{18}$ alkyl alkoxy carboxylates (especially the EO 1–5 ethoxycarboxylates), the $C_{10}$–$C_{18}$ glycerol ethers, the $C_{10}$–$C_{18}$ alkyl polyglycosides and their corresponding sulfated polyglycosides, and $C_{12}$–$C_{18}$ alpha-sulfonated fatty acid esters. If desired, the conventional nonionic and amphoteric surfactants such as the $C_{12}$–$C_{18}$ alkyl ethoxylates ("AE") including the so-called narrow peaked alkyl ethoxylates and $C_6$–$C_{12}$ alkyl phenol alkoxylates (especially ethoxylates and mixed ethoxy/propoxy), $C_{12}$–$C_{18}$ betaines and sulfobetaines ("sultaines"), $C_{10}$–$C_{18}$ amine oxides, and the like, can also be included in the overall compositions. The $C_{10}$–$C_{18}$ N-alkyl polyhydroxy fatty acid amides can also be used. Typical examples include the $C_{12}$–$C_{18}$ N-methylglucamides. See WO 9,206,154. Other sugar-derived surfactants include the N-alkoxy polyhydroxy fatty acid amides, such as $C_{10}$–$C_{18}$ N-(3-methoxypropyl) glucamide. The N-propyl through N-hexyl $C_{12}$–$C_{18}$ glucamides can be used for low sudsing. $C_{10}$–$C_{20}$ conventional soaps may also be used. If high sudsing is desired, the branched-chain $C_{10}$–$C_{16}$ soaps may be used. Mixtures of anionic and nonionic surfactants are especially useful. Other conventional useful surfactants are listed in standard texts.

Non-cotton Soil Release Agent

Known polymeric soil release agents, hereinafter "SRA", can optionally be employed in the present detergent compositions. If utilized, SRA's will generally comprise from 0.01% to 10.0%, typically from 0.1% to 5%, preferably from 0.2% to 3.0% by weight, of the compositions.

Preferred SRA's typically have hydrophilic segments to hydrophilize the surface of hydrophobic fibers such as polyester and nylon, and hydrophobic segments to deposit upon hydrophobic fibers and remain adhered thereto through completion of washing and rinsing cycles, thereby serving as an anchor for the hydrophilic segments. This can enable stains occurring subsequent to treatment with the SRA to be more easily cleaned in later washing procedures.

SRA's can include a variety of charged, e.g., anionic or even cationic species, see U.S. Pat. No. 4,956,447, issued Sep. 11, 1990 to Gosselink, et al., as well as noncharged monomer units, and their structures may be linear, branched or even star-shaped. They may include capping moieties which are especially effective in controlling molecular weight or altering the physical or surface-active properties. Structures and charge distributions may be tailored for application to different fiber or textile types and for varied detergent or detergent additive products.

Preferred SRA's include oligomeric terephthalate esters, typically prepared by processes involving at least one transesterification/oligomerization, often with a metal catalyst such as a titanium(IV) alkoxide. Such esters may be made using additional monomers capable of being incorporated into the ester structure through one, two, three, four or more positions, without, of course, forming a densely crosslinked overall structure.

Suitable SRA's include a sulfonated product of a substantially linear ester oligomer comprised of an oligomeric ester backbone of terephthaloyl and oxyalkyleneoxy repeat units and allyl-derived sulfonated terminal moieties covalently attached to the backbone, for example as described in U.S. Pat. No. 4,968,451, Nov. 6, 1990 to J. J. Scheibel and E. P. Gosselink. Such ester oligomers can be prepared by: (a) ethoxylating allyl alcohol; (b) reacting the product of (a) with dimethyl terephthalate ("DMT") and 1,2-propylene glycol ("PG") in a two-stage transesterification/oligomerization procedure; and (c) reacting the product of (b) with sodium metabisulfite in water. Other SRA's include the nonionic end-capped 1,2-propylene/polyoxyethylene terephthalate polyesters of U.S. Pat. No. 4,711,730, Dec. 8, 1987 to Gosselink et al., for example those produced by transesterification/oligomerization of poly(ethyleneglycol) methyl ether, DMT, PG and poly(ethyleneglycol) ("PEG"). Other examples of SRA's include: the partly- and fully-anionic-end-capped oligomeric esters of U.S. Pat. No. 4,721,580, Jan. 26, 1988 to Gosselink, such as oligomers from ethylene glycol ("EG"), PG, DMT and Na-3,6-dioxa-8-hydroxyoctanesulfonate; the nonionic-capped block polyester oligomeric compounds of U.S. Pat. No. 4,702,857, Oct. 27, 1987 to Gosselink, for example produced from DMT, methyl (Me)-capped PEG and EG and/or PG, or a combination of DMT, EG and/or PG, Me-capped PEG and Na-dimethyl-5-sulfoisophthalate; and the anionic, especially sulfoaroyl, end-capped terephthalate esters of U.S. Pat. No. 4,877,896, Oct. 31, 1989 to Maldonado, Gosselink et al., the latter being typical of SRA's useful inboth laundry and fabric conditioning products, an example being an ester composition made from m-sulfobenzoic acid monosodium salt, PG and DMT, optionally but preferably further comprising added PEG, e.g., PEG 3400.

SRA's also include: simple copolymeric blocks of ethylene terephthalate or propylene terephthalate with polyoxyethylene or polyoxypropylene terephthalate, see U.S. Pat. No. 3,959,230 to Hays, May 25, 1976 and U.S. Pat. No. 3,893,929 to Basadur, Jul. 8, 1975; cellulosic derivatives such as the hydroxyether cellulosic polymers available as METHOCEL from Dow; the $C_1$–$C_4$ alkyl celluloses and $C_4$ hydroxyalkyl celluloses, see U.S. Pat. No. 4,000,093, Dec. 28, 1976 to Nicol, et al.; and the methyl cellulose ethers having an average degree of substitution (methyl) per anhydroglucose unit from about 1.6 to about 2.3 and a solution viscosity of from about 80 to about 120 centipoise measured at 20° C. as a 2% aqueous solution. Such materials are available as METOLOSE SM100 and METOLOSE SM200, which are the trade names of methyl cellulose ethers manufactured by Shin-etsu Kagaku Kogyo KK.

Suitable SRA's characterised by poly(vinyl ester) hydrophobe segments include graft copolymers of poly(vinyl ester), e.g., $C_1$–$C_6$ vinyl esters, preferably poly(vinyl acetate), grafted onto polyalkylene oxide backbones. See European Patent Application 0 219 048, published Apr. 22, 1987 by Kud, et al. Commercially available examples include SOKALAN SRA's such as SOKALAN HP-22, available from BASF, Germany. Other SRA's are polyesters with repeat units containing 10–15% by weight of ethylene terephthalate together with 80–90% by weight of polyoxyethylene terephthalate derived from a polyoxyethylene glycol of average molecular weight 300–5,000. Commercial examples include ZELCON 5126 from Dupont and MILEASE T from ICI.

Another preferred SRA is an oligomer having empirical formula $(CAP)_2(EG/PG)_5(T)_5(SIP_1)$ which comprises terephthaloyl (T), sulfoisophthaloyl (SIP), oxyethyleneoxy and oxy-1,2-propyleneoxy (EG/PG) units and which is preferably terminated with end-caps (CAP), preferably modified isethionates, as in an oligomer comprising one sulfoisophthaloyl unit, 5 terephthaloyl units, oxyethyleneoxy and oxy-1,2-propyleneoxy units in a defined ratio, preferably about 0.5:1 to about 10:1, and two end-cap units derived from sodium 2-(2-hydroxyethoxy)-ethanesulfonate. Said SRA preferably further comprises from 0.5% to 20%, by weight of the oligomer, of a crystallinity-reducing stabilizer, for example an anionic surfactant such as linear sodium dodecylbenzenesulfonate or a member selected from xylene-, cumene-, and toluene- sulfonates or mixtures thereof, these stabilizers or modifiers being introduced into the synthesis vessel, all as taught in U.S. Pat. No. 5,415,807, Gosselink, Pan, Kellett and Hall, issued May 16, 1995. Suitable monomers for the above SRA include Na-2-(2-hydroxyethoxy)-ethanesulfonate, DMT, Na-dimethyl-5-sulfoisophthalate, EG and PG.

Yet another group of preferred SRA's are oligomeric esters comprising: (1) a backbone comprising (a) at least one unit selected from the group consisting of dihydroxysulfonates, polyhydroxy sulfonates, a unit which is at least trifunctional whereby ester linkages are formed resulting in a branched oligomer backbone, and combinations thereof; (b) at least one unit which is a terephthaloyl moiety; and (c) at least one unsulfonated unit which is a 1,2-oxyalkyleneoxy moiety; and (2) one or more capping units selected from nonionic capping units, anionic capping units such as alkoxylated, preferably ethoxylated, isethionates, alkoxylated propanesulfonates, alkoxylated propanedisulfonates, alkoxylated phenolsulfonates, sulfoaroyl derivatives and mixtures thereof. Preferred are esters of the empirical formula:

wherein CAP, EG/PG, PEG, T and SIP are as defined hereinabove, (DEG) represents di(oxyethylene)oxy units, (SEG) represents units derived from the sulfoethyl ether of glycerin and related moiety units, (B) represents branching units which are at least trifunctional whereby ester linkages are formed resulting in a branched oligomer backbone, x is from about 1 to about 12, y' is from about 0.5 to about 25, y" is from 0 to about 12, y'" is from 0 to about 10, y'+y"+y'" totals from about 0.5 to about 25, z is from about 1.5 to about 25, z' is from 0 to about 12; z+z' totals from about 1.5 to about 25, q is from about 0.05 to about 12; m is from about 0.01 to about 10, and x, y', y", y'", z, z', q and m represent the average number of moles of the corresponding units per mole of said ester and said ester has a molecular weight ranging from about 500 to about 5,000.

Preferred SEG and CAP monomers for the above esters include Na-2-(2,-3-dihydroxypropoxy)ethanesulfonate ("SEG"), Na-2-{2-(2-hydroxyethoxy) ethoxy}ethanesulfonate ("SE3") and its homologs and mixtures thereof and the products of ethoxylating and sulfonating allyl alcohol. Preferred SRA esters in this class include the product of transesterifying and oligomerizing sodium 2-{2-(2-hydroxyethoxy)ethoxy}ethanesulfonate and/or sodium 2-[2-{2-(2-hydroxyethoxy)ethoxy}-ethoxy]ethanesulfonate, DMT, sodium 2-(2,3-dihydroxypropoxy) ethane sulfonate, EG, and PG using an appropriate Ti(IV) catalyst and can be designated as $(CAP)2(T)5(EG/PG)1.4(SEG)2.5(B)0.13$ wherein CAP is $(Na+{-}O_3S[CH_2CH_2O]\ 3.5)-$ and B is a unit from glycerin and the mole ratio EG/PG is about 1.7:1 as measured by conventional gas chromatography after complete hydrolysis.

Additional classes of SRA's include: (I) nonionic terephthalates using diisocyanate coupling agents to link polymeric ester structures, see U.S. Pat. No. 4,201,824, Violland et al. and U.S. Pat. No. 4,240,918 Lagasse et al.; and (II) SRA's with carboxylate terminal groups made by adding trimellitic anhydride to known SRA's to convert terminal hydroxyl groups to trimellitate esters. With the proper selection of catalyst, the trimellitic anhydride forms linkages to the terminals of the polymer through an ester of the isolated carboxylic acid of trimellitic anhydride rather than by opening of the anydride linkage. Either nonionic or anionic SRA's may be used as starting material as long as they have hydroxyl terminal groups which may be esterified. See U.S. Pat. No. 4,525,524 Tung et al.. Other classes include: (III) anionic terephthalate-based SRA's of the urethane-linked variety, see U.S. Pat. No. 4,201,824, Violland et al.; (IV) poly(vinyl caprolactam) and related co-polymers with monomers such as vinyl pyrrolidone and/or dimethylaminoethyl methacrylate, including both nonionic and cationic polymers, see U.S. Pat. No. 4,579,681, Ruppert et al.; (V) graft copolymers, in addition to the SOKALAN types from BASF, made by grafting acrylic monomers onto sulfonated polyesters. These SRA's assertedly have soil release and anti-redeposition acitvity similar to known cellulose ethers: see EP 279,134 A, 1988, to Rhone-Poulenc Chemie. Still other classes include: (VI) grafts of vinyl monomers such as acrylic acid and vinyl acetate onto proteins such as caseins, see EP 457,205 A to BASF (1991); and (VII) polyester-polyamide SRA's prepared by condensing adipic acid, caprolactam, and polyethylene glycol, especially for treating polyamide fabrics, see Bevan et al., DE 2,335,044 to Unilever N. V., 1974. Other useful SRA's are described in U.S. Pat. Nos. 4,240,918, 4,787,989 and 4,525,524.

Bleaching Compounds—Bleaching Agents and Bleach Activators

The detergent compositions herein may optionally contain bleaching agents or bleaching compositions containing a bleaching agent and one or more bleach activators. When present, bleaching agents will be at levels of from about 0.05% to about 30%, more preferably from about 1% to about 30%, most preferably from about 5% to about 20%, of the detergent composition, especially for fabric laundering. If present, the amount of bleach activators will typically be from about 0.1% to about 60%, more typically from about 0.5% to about 40% of the bleaching composition comprising the bleaching agent-plus-bleach activator.

The bleaching agents used herein can be any of the bleaching agents useful for detergent compositions in textile cleaning, hard surface cleaning, or other cleaning purposes that are now known or become known. These include oxygen bleaches as well as other bleaching agents. Perborate bleaches, e.g., sodium perborate (e.g., mono- or tetra-hydrate) can be used herein.

Another category of bleaching agent that can be used without restriction encompasses percarboxylic acid bleaching agents and salts thereof. Suitable examples of this class of agents include magnesium monoperoxyphthalate hexahydrate, the magnesium salt of metachloro perbenzoic acid, 4-nonylamino-4-oxoperoxybutyric acid and diperoxy-dodecanedioic acid. Such bleaching agents are disclosed in U.S. Pat. No. 4,483,781, Hartman, issued Nov. 20, 1984, U.S. patent application Ser. No. 740,446, Burns et al, filed Jun. 3, 1985, European Patent Application 0,133,354, Banks et al, published Feb. 20, 1985, and U.S. Pat. No. 4,412,934, Chung et al, issued Nov. 1, 1983. Highly preferred bleaching agents also include 6-nonylamino-6-oxoperoxycaproic acid as described in U.S. Pat. No. 4,634,551, issued Jan. 6, 1987 to Burns et al.

Peroxygen bleaching agents can also be used. Suitable peroxygen bleaching compounds inlcude sodium carbonate peroxyhydrate and equivalent "percarbonate" bleaches, sodium pyrophosphate peroxyhydrate, urea peroxyhydrate, and sodium peroxide. Persulfate bleach (e.g., OXONE, manufactured commerically by DuPont) can also be used.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with silicate, borate or water-soluble surfactants. Percarbonate is available from various commercial sources such as FMC, Solvay and Tokai Denka.

Mixtures of bleaching agents can also be used.

Peroxygen bleaching agents, the perborates, the percarbonates, etc., are preferably combined with bleach activators, which lead to the in situ production in aqueous solution (i.e., during the washing process) of the peroxy acid corresponding to the bleach activator. Various nonlimiting examples of activators are disclosed in U.S. Pat. No. 4,915,854, issued Apr. 10, 1990 to Mao et al, and U.S. Pat. No. 4,412,034. The nonanoyloxybenzene sulfonate (NOBS) and tetraacetyl ethylene diamine (TAED) activators are typical, and mixtures thereof can also be used. See also U.S. Pat. No. 4,634,551 for other typical bleaches and activators useful herein.

Highly preferred amido-derived bleach activators are those of the formulae:

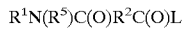

or

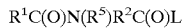

wherein $R^1$ is an alkyl group containing from about 6 to about 12 carbon atoms, $R^2$ is an alkylene containing from 1 to about 6 carbon atoms, $R^5$ is H or alkyl, aryl, or alkaryl containing from about 1 to about 10 carbon atoms, and L is any suitable leaving group. A leaving group is any group that is displaced from the bleach activator as a consequence of the nucleophilic attack on the bleach activator by the perhydrolysis anion. A preferred leaving group is phenyl sulfonate.

Preferred examples of bleach activators of the above formulae include (6-octanamido-caproyl) oxybenzenesulfonate, (6-nonanamidocaproyl) oxybenzenesulfonate, (6-decanamido-caproyl) oxybenzenesulfonate, and mixtures thereof as described in U.S. Pat. No. 4,634,551, incorporated herein by reference.

Another class of bleach activators comprises the benzoxazin-type activators disclosed by Hodge et al in U.S. Pat. No. 4,966,723, issued Oct. 30, 1990, incorporated herein by reference. A highly preferred activator of the benzoxazin-type is:

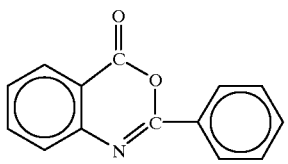

Still another class of preferred bleach activators includes the acyl lactam activators, especially acyl caprolactams and acyl valerolactams of the formulae:

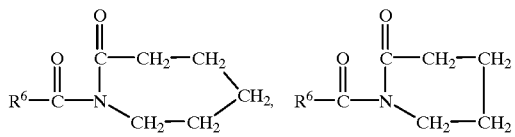

wherein $R^6$ is H or an alkyl, aryl, alkoxyaryl, or alkaryl group containing from 1 to about 12 carbon atoms. Highly preferred lactam activators include benzoyl caprolactam, octanoyl caprolactam, 3,5,5-trimethylhexanoyl caprolactam, nonanoyl caprolactam, decanoyl caprolactam, undecenoyl caprolactam, benzoyl valerolactam, octanoyl valerolactam, decanoyl valerolactam, undecenoyl valerolacatam, nonanoyl valerolactam, 3,5,5-trimethylhexanoyl valerolactam and mixtures thereof. See also U.S. Pat. No. 4,545,784, issued to Sanderson, Oct. 8, 1985, incorporated herein by reference, which discloses acyl caprolactams, including benzoyl caprolactam, adsorbed into sodium perborate.

Bleaching agents other than oxygen bleaching agents are also known in the art and can be utilized herein. One type of non-oxygen bleaching agent of particular interest includes photoactivated bleaching agents such as the sulfonated zinc and/or aluminum phthalocyanines. See U.S. Pat. No. 4,033,718, issued Jul. 5, 1977 to Holcombe et al. If used, detergent compositions will typically contain from about 0.025% to about 1.25%, by weight, of such bleaches, especially sulfonate zinc phthalocyanine.

If desired, the bleaching compounds can be catalyzed by means of a manganese compound. Such compounds are well known in the art and include, for example, the manganese-based catalysts disclosed in U.S. Pat. No. 5,246,621, U.S. Pat. No. 5,244,594; U.S. Pat. No. 5,194,416; U.S. Pat. No. 5,114,606; and European Pat. Appl Publ Nos. 549,271A1, 549,272A1, 544,440A2, and 544,490A1; Preferred examples of these catalysts include $Mn^{IV}_2(u-O)_3(1,4,7-trimethyl-1,4,7-triazacyclononane)_2(PF_6)_2$, $Mn^{III}_2(u-O)_1(u-OAc)_2(1,4,7-trimethyl-1,4,7-triazacyclononane)_2-(ClO_4)_2$, $Mn^{IV}_4(u-O)_6(1,4,7-triazacyclononane)_4)ClO_4)_4$, $Mn^{III}Mn^{IV}_4(u-O)_1(u-OAc)_2-(1,4,7-trimethyl-1,4,7-$ triazacyclononane)$_2$(ClO$_4$)$_3$, Mn$^{IV}$(1,4,7-trimethyl-1,4,7-triazacyclononane)-(OCH$_3$)$_3$(PF$_6$), and mixtures thereof. Other metal-based bleach catalysts include those disclosed in U.S. Pat. No. 4,430,243 and U.S. Pat. No. 5,114,611. The use of manganese with various complex ligands to enhance bleaching is also reported in the following U.S. Pat. Nos.: 4,728,455; 5,284,944; 5,246,612; 5,256,779; 5,280,117; 5,274,147; 5,153,161; and 5,227,084.

As a practical matter, and not by way of limitation, the compositions and processes herein can be adjusted to provide on the order of at least one part per ten million of the active bleach catalyst species in the aqueous washing liquor, and will preferably provide from about 0.1 ppm to about 700 ppm, more preferably from about 1 ppm to about 500 ppm, of the catalyst species in the laundry liquor.

A wide variety of other ingredients useful in detergent compositions can be included in the compositions herein, including other active ingredients, carriers, hydrotyropes, processing aids, dyes or pigments, solvents for liquid formulations, solid fillers for bar compositions, etc. If high sudsing is desired, suds boosters such as the C$_{10}$–C$_{16}$ alkanolamides can be incorporated into the compositions, typically at 1%–10% levels. The C$_{10}$–C$_{14}$ monoethanol and ethanol amides illustrate a typical class of such suds boosters. Use of such suds boosters with high sudsing adjunct surfactants such as the amine oxides, betaines and sultaines noted above is also advantageous. If desired, soluble magnesium salts such as MgCl$_2$, MgSO$_4$, and the like, can be added at levels of, typically, 0.1%–2%, to provide additional suds and to enhance grease removal performance.

Various detersive ingredients employed in the present compositions optionally can be further stabilized by absorbing said ingredients onto a porous hydrophobic substrate, then coating said substrate with a hydrophobic coating. Preferably, the detersive ingredient is admixed with a surfactant before being absorbed into the porous substrate. In use, the detersive ingredient is released from the substrate into the aqueous washing liquor, where it performs its intended detersive function.

To illustrate this technique in more detail, a porous hydrophobic silica (trademark SIPERNAT D10, DeGussa) is admixed with a proteolytic enzyme solution containing 3%–5% of C$_{13-15}$ ethoxylated alcohol (EO 7) nonionic surfactant. Typically, the enzyme-surfactant solution is 2.5 X the weight of silica. The resulting powder is dispersed with stirring in silicone oil (various silicone oil viscosities in the range of 500–12,500 can be used). The resulting silicone oil dispersion is emulsified or otherwise added to the final detergent matrix. By this means, ingredients such as the aforementioned enzymes, bleaches, bleach activators, bleach catalysts, photoactivators, dyes, fluorescers, fabric conditioners and hydrolyzable surfactants can be "protected" for use in detergents, including liquid laundry detergent compositions.

Liquid detergent compositions can contain water and other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerin, and 1,2-propanediol) can also be used. The compositions may contain from 5% to 90%, typically 10% to 50% of such carriers.

The detergent compositions herein will preferably be formulated such that, during use in aqueous cleaning operations, the wash water will have a pH of between about 6.5 and about 11, preferably between about 7.5 and 10.5. Granular laundry products are typically at pH9–11. Techniques for controlling pH at recommended usage levels include the use of buffers, alkalis, acids, etc., and are well known to those skilled in the art.

Enzymes

Enzymes can be included in the present detergent compositions for a variety of purposes, including removal of protein-based, carbohydrate-based, or triglycertide-based stains from surfaces such as textiles, for the prevention of refugee dye transfer, for example in laundering, and for fabric restoration. Suitable enzymes include proteases, amylases, lipases, cellulases, peroxidases, and mixtures thereof of any suitable origin, such as vegetable, animal, bacterial, fungal and yeast origin. Preferred selections are influenced by factors such as pH-activity and/or stability optima, thermostability, and stability to active detergents, builders and the like. In this respect bacterial or fungal enzymes are preferred, such as bacterial amylases and proteases, and fungal cellulases.

"Detersive enzyme", as used herein, means any enzyme having a cleaning, stain removing or otherwise beneficial effect in a laundry, hard surface cleaning or personal care detergent composition. Preferred detersive enzymes are hydrolases such as proteases, amylases and lipases. Preferred enzymes for laundry purposes include, but are not limited to, proteases, cellulases, lipases and peroxidases.

Enzymes are normally incorporated into detergent or detergent additive compositions at levels sufficient to provide a "cleaning-effective amount". The term "cleaning effective amount" refers to any amount capable of producing a cleaning, stain removal, soil removal, whitening, deodorizing, or freshness improving effect on substrates such as fabrics. In practical terms for current commercial preparations, typical amounts are up to about 5 mg by weight, more typically 0.01 mg to 3 mg, of active enzyme per gram of the detergent composition. Stated otherwise, the compositions herein will typically comprise from 0.001% to 5%, preferably 0.01%–1% by weight of a commercial enzyme preparation. Protease enzymes are usually present in such commercial preparations at levels sufficient to provide from 0.005 to 0.1 Anson units (AU) of activity per gram of composition. For certain detergents, it may be desirable to increase the active enzyme content of the commercial preparation in order to minimize the total amount of non-catalytically active materials and thereby improve spotting/filming or other end-results. Higher active levels may also be desirable in highly concentrated detergent formulations.

Suitable examples of proteases are the subtilisins which are obtained from particular strains of B. subtilis and B. licheniformis. One suitable protease is obtained from a strain of Bacillus, having maximum activity throughout the pH range of 8–12, developed and sold as ESPERASE® by Novo Industries A/S of Denmark, hereinafter "Novo". The preparation of this enzyme and analogous enzymes is described in GB 1,243,784 to Novo. Other suitable proteases include ALCALASE® and SAVINASE® from Novo and MAXATASE® from International Bio-Synthetics, Inc., The Netherlands; as well as Protease A as disclosed in EP 130,756 A, Jan. 9, 1985 and Protease B as disclosed in EP 303,761 A, Apr. 28, 1987 and EP 130,756 A, Jan. 9, 1985. See also a high pH protease from Bacillus sp. NCIMB 40338 described in WO 93/181140 A to Novo. Enzymatic detergents comprising protease, one or more other enzymes, and a reversible protease inhibitor are described in WO 92/03529 A to Novo. Other preferred proteases include those of WO 95/10591 A to Procter & Gamble. When desired, a protease having decreased adsorption and increased hydrolysis is available as described in WO 95/07791 to Procter & Gamble. A recombinant trypsin-like protease for detergents suitable herein is described in WO 94/25583 to Novo.

In more detail, an especially preferred protease, referred to as "Protease D" is a carbonyl hydrolase variant having an amino acid sequence not found in nature, which is derived from a precursor carbonyl hydrolase by substituting a different amino acid for a plurality of amino acid residues at a position in said carbonyl hydrolase equivalent to position +76, preferably also in combination with one or more amino acid residue positions equivalent to those selected from the group consisting of +99, +101, +103, +104, +107, +123, +27, +105, +109, +126, +128, +135, +156, +166, +195, +197, +204, +206, +210, +216, +217, +218, +222, +260, +265, and/or +274 according to the numbering of *Bacillus amyloliquefaciens* subtilisin, as described in WO 95/10615 published Apr. 20, 1995 by Genencor International.

Useful proteases are also described in PCT publications: WO 95/30010 published Nov. 9, 1995 by The Procter & Gamble Company; WO 95/30011 published Nov. 9, 1995 by the Procter & Gamble Company; WO 95/29979 published Nov. 9, 1995 by The Procter & Gamble Company.

Amylases suitable herein, include, for example, α-amylases described in GB 1,296,839 to Novo; RAPIDASE®, International Bio-Synthetics, Inc. and TERMAMYL®, Novo. FUNGAMYL® from Novo is especially useful. Engineering of enzymes for improved stability, e.g., oxidative stability, is known. See, for example J. Biological Chem., Vol. 260, No. 11, June 1985, pp. 6518–6521. Certain preferred embodiments of the present compositions can make use of amylases having improved stability in detergents, especially improved oxidative stability as measured against a reference-point of TERMAMYL® in commerical use in 1993. These preferred amylases herein share the characteristic of being "stability-enhanced" amylases, characterized, at a minimum, by a measurable improvement in one or more of: oxidative stability, e.g., to hydrogen peroxide/tetraacetylethylenediamine in buffered solution at pH 9–10; thermal stability, e.g., at common wash temperatures such as about 60° C.; or alkaline stability, e.g., at a pH from about 8 to about 11, measured versus the above-identified reference-point amylase. Stability can be measured using any of the art-disclosed technical tests. See, for example, references disclosed in WO 94/02597. Stability-enhanced amylases can be obtained from Novo or from Genencor International. One class of highly preferred amylases herein have the commonality of being derived using site-directed mutagenesis from one or more of the Baccillus amylases, especially the Bacillus α-amylases, regardless of whether one, two or multiple amylase strains are the immediate precursors. Oxidative stability-enhanced amylases vs. the above-identified reference amylase are preferred for use, especially in bleaching, more preferably oxygen bleaching, as distinct from chlorine bleaching, detergent compositions herein. Such preferred amylases include (a) an amylase according to the hereinbefore incorporated WO 94/02597, Novo, Feb. 3, 1994, as further illustrated by a mutant in which substitution is made, using alanine or threonine, preferably threonine, of the methionine residue located in position 197 of the *B.licheniformis* alpha-amlyase, known as TERMAMYL®, or the homologous position variation of a similar parent amylase, such as *B. amyloliquefaciens, B.subtilis,* or *B.stearothermophilus;* (b) stability-enhanced amylases as described by Genencor International in a paper entitled "Oxidatively Resistant alpha-Amylases" presented at the 207the American Chemical Society National Meeting, Mar. 13–17 1994, by C. Mitchinson. Therein it was noted that bleaches in automatic dishwashing detergents inactivate alpha-amylases but that improved oxidative stability amylases have been made by Genencor from *B.licheniformis* NCIB8061. Methionine (Met) was identified as the most likely residue to be modified. Met was substituted, one at a time, in positions 8, 15, 197, 256, 304, 366 and 438 leading to specific mutants, particularly important being M197L and M197T with the M197T variant being the most stable expressed variant. Stability was measured in CASCADE® and SUNLIGHT®; (c) particularly preferred amylases herein include amylase variants having additional modification in the immediate parent as described in WO 95/10603 A and are available from the assignee, Novo, as DURAMYL®. Other particularly preferred oxidative stability enhanced amylase include those described in WO 94/18314 to Genencor International and WO 94/02597 to Novo. Any other oxidative stability-enhanced amylase can be used, for example as derived by site-directed mutagenesis from known chimeric, hybrid or simple mutant parent forms of available amylases. Other preferred enzyme modifications are accessible. See WO 95/09909 A to Novo.

Cellulases usable herein include both bacterial and fungal types, preferably having a pH optimum between 5 and 9.5. U.S. Pat. No. 4,435,307, Barbesgoard et al, Mar. 6, 1984, discloses suitable fungal cellulases from *Humicola insolens* or Humicola strain DSM1800 or a cellulase 212-producing fungus belonging to the genus Aeromonas, and cellulase extracted from the hepatopancreas of a marine mollusk, Dolabella Auricula Solander. Suitable cellulases are also disclosed in GB-A-2.075.028; GB-A-2.095.275 and DE-OS-2.247.832. CAREZYME® (Novo) is especially useful. See also WO 91/17243 to Novo.

Suitable lipase enzymes for detergent usage include those produced by microorganisms of the Pseudomonas group, such as *Pseudomonas stutzeri* ATCC 19.154, as disclosed in GB 1,372,034. See also lipases in Japanese Patent Application 53,20487, laid open Feb. 24, 1978. This lipase is available from Amano Pharmaceutical Co. Ltd., Nagoya, Japan, under the trade name Lipase P "Amano, " or "Amano-P." Other suitable commercial lipases include Amano-CES, lipases ex *Chromobacter viscosum,* e.g. *Chromobacter viscosum var. lipolyticum* NRRLB 3673 from Toyo Jozo Co., Tagata, Japan; *Chromobacter viscosum* lipases from U.S. Biochemical Corp. U.S.A. and Disoynth Co., The Netherlands, and lipases ex *Pseudomonas gladioli.* LIPOLASE® enzyme derived from *Humicola lanuginosa* and commercially available from Novo, see also EP 341, 947, is a preferred lipase for use herein. Lipase and amylase variants stabilized against peroxidase enzymes are described in WO 94/14951 A to Novo. See also WO 92/05249 and RD 94/359044.

Cutinase enzymes suitable for use herein are described in WO 88/09367 A to Genencor.

Peroxidase enzymes may be used in combination with oxygen sources, e.g., percarbonate, perborate, hydrogen peroxide, etc., for "solution bleaching" or prevention of transfer of dyes or pigments removed from substrates during the wash to other substrates present in the wash solution. Known peroxidases include horseradish peroxidase, ligninase, and haloperoxidases such as chloro- or bromo-peroxidase. Peroxidase-containing detergent compositions are disclosed in WO 89/099813 A, Oct. 19, 1989 to Novo and WO 89/09813 A to Novo.

A range of enzyme materials and means for their incorporaton into synthetic detergent compositions is also disclosed in WO 93/07263 A and WO 93/07260 A to Genencor International, WO 89/08694 A to Novo, and U.S. Pat. No. 3,553,139, Jan. 5, 1971 to McCarty et al. Enzymes are further disclosed in U.S. Pat. No. 4,101,457, Place et al, Jul. 18, 1978, and in U.S. Pat. No. 4,507,219, Hughes, Mar. 26, 1985. Enzyme materials useful for liquid detergent formulations, and their incorporation into such formulations, are disclosed in U.S. Pat. No. 4,261,868, Hora et al, Apr. 14, 1981. Enzymes for use in detergents can be stabilized by various techniques. Enzyme stabilization techniques are disclosed and exemplified in U.S. Pat. No. 3,600,319, Aug. 17, 1971, Gedge et al, EP 199,405 and EP 200,586, Oct. 29, 1986, Venegas. Enzyme stabilization systems are also described, for example, in U.S. Pat. No. 3,519,570. A useful Bacillus, sp. AC13 giving proteases, xylanases and cellulases, is described in WO 94/01532 A to Novo.

Enzyme Stabilizing System

Enzyme-containing, including but not limited to, liquid compositions, herein may comprise from about 0.001% to about 10%, preferably from about 0.005% to about 8%, most preferably from about 0.01% to about 6%, by weight of an enzyme stabilizing system. The enxyme stabilizing system can be any stabilizing system which is compatible with the detersive enzyme. Such a system may be inherently provided by other formulation actives, or be added separately, e.g., by the formulator or by a manufacturer of detergent-ready enzymes. Such stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

One stabilizing approach is the use of water-soluble sources of calcium and/or magnesium ions in the finished compositions which provide such ions to the enzymes. Calcium ions are generally more effective than magnesium ions and are preferred herein if only one type of cation is being used. Typical detergent compositions, especially liquids, will comprise from about 1 to about 30, preferably from about 2 to about 20, more preferably from about 8 to about 12 millimoles of calcium ion per liter of finished detergent composition, though variation is possible depending on factors including the multiplicity, type and levels of enzymes incorporated. Preferably water-soluble calcium or magnesium salts are employed, including for example calcium chloride, calcium hydroxide, calcium formate, calcium alate, calcium maleate, calcium hydroxide and calcium acetate; more generally, calcium sulfate or magnesium salts corresponding to the exemplified calcium salts may be used. Further increased levels of Calcium and/or Magnesium may of course be useful, for example for promoting the grease-cutting action of certain types of surfactant.

Another stabilizing approach is by use of borate species. See Severson, U.S. Pat. No. 4,537,706. Borate stabilizers, when used, may be at levels of up to 10% or more of the composition though more typically, levels of up to about 3% by weight of boric acid or other borate compounds such as borax or orthoborate are suitable for liquid detergent use. Substituted boric acids such as phenylboronic acid, butaneboronic acid, p-bromophenylboronic acid or the like can be used in place of boric acid and reduced levels of total boron in detergent compositions may be possible though the use of such substituted boron derivatives.

Stabilizing systems of certain cleaning compositions, may further comprise from 0 to about 10%, preferably from about 0.01% to about 6% by weight, of chlorine bleach scavengers, added to prevent chlorine bleach species present in many water supplies from attacking and inactivating the enzymes, especially under alkaline condiitons. While chlorine levels in water may be small, typically in the range from about 0.5 ppm to about 1.75 ppm, the available chlorine in the total volume of water that comes in contact with the enzyme, for example during fabric-washing, can be relatively large; accordingly, enzyme stability to chlorine in-use is sometimes problematic. Since perborate or percarbonate, which have the ability to react with chlorine bleach, may present in certain of the instant compositions in amounts accounted for separately from the stablizing system, the use of additional stabilizers against chlorine, may, most generally, not be essential, though improved results may be obtainable from their use. Suitable chlorine scavenger anions are widely known and readily available, and, if used, can be salts containing ammonium cations with sulfite, bisulfite, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can likewise be used. Likewise, special enzyme inhibition systems can be incorporated such that different enzymes have maximum compatibility. Other conventional scavengers such as bisulfate, nitrate, chloride, sources of hydrogen peroxide such as sodium perborate tetrahydrate, sodium perborate monohydrate and sodium percarbonate, as well as phosphate, condensed phosphate, acetate, benzoate, citrate, formate, lactate, malate, tartrate, salicylate, etc., and mixtures thereof can be used if desired. In general, since the chlorine scavenger function can be performed by ingredients separately listed under better recognized functions, (e.g., hydrogen peroxide sources), there is no absolute requirement to add a separate chlorine scavenger unless a compound performing that function to the desired extent is absent from an enzyme-containing embodiment of the invention; even then, the scavenger is added only for optimum results. Moreover, the formulator will exercise a chemist's normal skill in avoiding the use of any enzyme scavenger or stabilizer which is majority incompatible, as formulated, with other reactive ingredients, if used. In relation to the use of ammonium salts, such salts can be simply admixed with the detergent composition but are prone to adsorb water and/or liberate ammonia during storage. Accordingly, such materials, if present, are desirably protected in a particle such as that described in U.S. Pat. No. 4,652,392, Baginski et al.

The compositions herein can optionally include one or more other detergent adjunct materials or other materials for assisting or enhancing cleaning performance, treatment of the substrate to be cleaned, or to modify the aesthetics of the detergent composition (e.g., perfumes, colorants, dyes, etc.). The following are illustrative examples of such adjunct materials.

Builders

Detergent builders can optionally be included in the compositions herein to assist in controlling mineral hardness. Inorganic as well as organic builders can be used. Builders are typically used in fabric laundering compositions to assist in the removal of particulate soils.

The level of builder can vary widely depending upon the end use of the composition and its desired physical form. When present, the compositions will typically comprise at least about 1% builder. Liquid formulations typically comprise from about 5% to about 50%, more typically about 5% to about 30%, by weight, of detergent builder. Granular formulations typically comprise from about 10% to about 80%, more typically from about 15% to about 50% by weight, of the detergent builder. Lower or higher levels of builder, however, are not meant to be excluded.

Inorganic or P-containing detergent builders include, but are not limited to, the alkali metal, ammonium and alkanolammonium salts of polyphosphates (exemplified by the tripolyphosphates, pyrophosphates, and glassy polymeric meta-phosphates), phosphonates, phytic acid, silicates, carbonates (including bicarbonates and sesquicarbonates), sulphates, and aluminosilicates. However, non-phosphate builders are required in some locales. Importantly, the compositions herein function surprisingly well even in the presence of the so-called "weak" builders (as compared with phosphates) such as citrate, or in the so-called "underbuilt" situation that may occur with zeolite or layered silicate builders.

Examples of silicate builders are the alkali metal silicates, particularly those having a $SiO_2:Na_2O$ ratio in the range 1.6:1 to 3.2:1 and layered silicates, such as the layered sodium silicates described in U.S. Pat. No. 4,664,839, issued May 12, 1987 to H. P. Rieck. NaSKS-6 is the trademark for a crystalline layered silicate marketed by Hoechst (commonly abbreviated herein as "SKS-6"). Unlike zeolite builders, the Na SKS-6 silicate builder does not contain aluminum. NaSKS-6 has the delta-$Na_2SiO_5$ morphology form of layered silicate. It can be prepared by methods such as those described in German DE-A-3,417,649 and DE-A-3,742,043. SKS-6 is a highly preferred layered silicate for use herein, but other such layered silicates, such as those having the general formula $NaMSi_xO_{2x+1} \cdot yH_2O$ wherein M is sodium or hydrogen, x is a number from 1.9 to 4, preferably 2, and y is a number from 0 to 20, preferably 0 can be used herein. Various other layered silicates from Hoechst include NaSKS-5, NaSKS-7 and NaSKS-11, as the alpha, beta and gamma forms. As noted above, the delta-$Na_2SiO_5$ (NaSKS-6form) is most preferred for use herein. Other silicates may also be useful such as for example magnesium silicate, which can serve as a crispening agent in granular formulations, as a stabilizing agent for oxygen bleaches, and as a component of suds control systems.

Examples of carbonate builders are the alkaline earth and alkali metal carbonates as disclosed in German Patent Application No. 2,321,001 published on Nov. 15, 1973.

Aluminosilicate builders are useful in the present invention. Aluminosilicate builders are of great importance in most currently marketed heavy duty granular detergent compositions, and can also be a significant builder ingredient in liquid detergent formulations. Aluminosilicate builders include those having the empirical formula:

$$M_z[(zAlO_2)_y] \cdot xH_2O$$

wherein z and y are integers of at least 6, the molar ratio of z to y is in the range from 1.0 to about 0.5, and x is an integer from about 15 to about 264.

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669, Krummel, et al, issued Oct. 12, 1976. Preferred synthetic crystalline aluminosilicate ion exchange materials useful herein are available under the designations Zeolite A, Zeolite P (B), Zeolite MAP and Zeolite X. In an especially preferred embodiment, the crystalline aluminosilicate ion exchange material has the formula:

$$Na_{12}[(AlO_2)_{12}(SiO_2)_{12}] \cdot xH_2O$$

wherein x is from about 20 to about 30, especially about 27. This material is known as Zeolite A. Dehydrated zeolites (x=0–10) may also be used herein. Preferably, the aluminosilicate has a particle size of about 0.1–10 microns in diameter.

Organic detergent builders suitable for the purposes of the present invention include, but are not restricted to, a wide variety of polycarboxylate compounds. As used herein, "polycarboxylate" refers to compounds having a plurality of carboxylate groups, preferably at least 3 carboxylates. Polycarboxylate builder can generally be added to the composition in acid form, but can also be added in the form of a neutralized salt. When utilized in salt form, alkali metals, such as sodium, potassium, and lithium, or alkanolammonium salts are preferred.

Included among the polycarboxylate builders are a variety of categories of useful material. One important category of polycarboxylate builders encompasses the ether polycarboxylates, including oxydisuccinate, as disclosed in Berg, U.S. Pat. No. 3,128,287, issued Apr. 7, 1964, and Lamberti et al, U.S. Pat. No. 3,635,830, issued Jan. 18, 1972. See also "TMS/TDS" builders of U.S. Pat. No. 4,663,071, issued to Bush et al, on May 5, 1987. Suitable ether polycarboxylates also include cyclic compounds, particularly alicyclic compounds, such as those described in U.S. Pat. Nos. 3,923,679; 3,835,163; 4,158,635; 4,120,874 and 4,102,903.

Other useful detergency builders include the ether hydroxypolycarboxylates, copolymers of maleic anhydride with ethylene or vinyl methyl ether, 1, 3, 5-trihydroxy benzene-2, 4, 6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Citrate builders, e.g., citric acid and soluble salts thereof (particularly sodium salt), are polycarboxylate builders of particular importance for heavy duty liquid detergent formulations due to their availability from renewable resources and their biodegradability. Citrates can also be used in granular compositions, especially in combination with zeolite and/or layered silicate builders. Oxydisuccinates are also especially useful in such compositions and combinations.

Also suitable in the detergent compositions of the present invention are the 3,3-dicarboxy-4-oxa-1,6-hexanedioates and the related compounds disclosed in U.S. Pat. No. 4,566,984, Bush, issued Jan. 28, 1986. Useful succinic acid builders include the $C_5–C_{20}$ alkyl and alkenyl succinic acids and salts thereof. A particularly preferred compound of this type is dodecenylsuccinic acid. Specific examples of succinate builders include: laurylsuccinate, myristylsuccinate, palmitylsuccinate, 2-dodecenylsuccinate (preferred), 2-pentadecenylsuccinate, and the like. Laurylsuccinates are the preferred builders of this group, and are described in European Patent Application 862000690.5/0,200,263, published Nov. 5, 1986.

Other suitable polycarboxylates are disclosed in U.S. Pat. No. 4,144,226, Crutchfield et al, issued Mar. 13, 1979 and in U.S. Pat. No. 3,308,067, Diehl, issued Mar. 7, 1967. See also Diehl U.S. Pat. No. 3,723,322.

Fatty acids, e.g., $C_{12}–C_{18}$ monocarboxylic acids, can also e incorporated into the compositions alone, or in combination with the aforesaid builders, especially citrate and/or the succinate builders, to provide additional builder activity. Such use of fatty acids will generally result in a diminution of sudsing, which should be taken into account by the formulator.

In situations where phosphorus-based builders can be used, and especially in the formulation of bars used for hand-laundering operations, the various alkali metal phosphates such as the well-known sodium tripolyphosphates, sodium pyrophosphate and sodium orthophosphate can be used. Phosphonate builders such as ethane-1-hydroxy-1,1-diphosphonate and other known phosphonates (see, for example, U.S. Pat. Nos. 3,159,581; 3,213,030; 3,422,021; 3,400,148 and 3,422,137) can also be used.

Chelating Agents

The detergent compositions herein may also optionally contain one or more iron and/or manganese chelating agents. Such chelating agents can be selected from the group consisting of amino carboxylates, amino phosphonates, polyfunctionally-substituted aromatic chelating agents and mixtures therein, all as hereinafter defined. Without intending to be bound by theory, it is believed that the benefit of these materials is due in part to their exceptional ability to remove iron and manganese ions from washing solutions by formation of soluble chelates.

Amino carboxylates useful as optional chelating agents include ethylenediaminetetracetates, N-hydroxyethylethylenediaminetriacetates, nitrilotriacetates, ethylenediamine tetraproprionates, triethylenetetraaminehexacetates, diethylenetriaminepentaacetates, and ethanoldiglycines, alkali metal, ammonium, and substituted ammonium salts therein and mixtures therein. Also suitable for use as a chelant is methylglycine di-acetic acid (MGDA).

Amino phosphonates are also suitable for use as chelating agents in the compositions of the invention when at lease low levels of total phosphorus are permitted in detergent compositions, and include ethylenediaminetetrakis (methylenephosphonates) as DEQUEST. Preferred, these amino phosphonates to not contain alkyl or alkenyl groups with more than about 6 carbon atoms.

Polyfunctionally-substituted aromatic chelating agents are also useful in the compositions herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelator for use herein is ehtylenediamine disuccinate ("EDDS"), especially the [S,S] isomer as described in U.S. Pat. No. 4,704,233, Nov. 3, 1987, to Hartman and Perkins.

If utilized, these chelating agents will generally comprise from about 0.1% to about 10% by weight of the detergent compositions herein. More preferably, if utilized, the chelating agents will comprise from about 0.1% to about 3.0% by weight of such compositions.

Clay Soil Removal/Anti-redeposition Agents

The compositions of the present invention can also optionally contain water-soluble ethoxylated amines having clay soil removal and antideposition properties. Granular detergent compositions which contain these compounds typically contain from about 0.01% to about 10.0% by weight of the water-soluble ethoxylates amines; liquid detergent compositions typically contain about 0.01% to about 5%.

The most preferred soil release and anti-redeposition agent is ethoxylated tetraethylenepentamine. Exemplary ethoxylated amines are further described in U.S. Pat. No. 4,597,898, VanderMeer, issued Jul. 1, 1986. Another group of preferred clay soil removal-antideposition agents are the cationic compounds disclosed in European Patent Application 111,965, Oh and Gosselink, published Jun. 27, 1984. Other clay soil removal/antiredeposition agents which can be used include the ethoxylated amine polymers disclosed in European Patent Application 111,984, Gosselink, published Jun. 27, 1984; the zwitterionic polymers disclosed in European Patent Application 112,592, Gosselink, published Jul. 4, 1984; and the amine oxides disclosed in U.S. Pat. No. 4,548,744, Connor, issued Oct. 22, 1985. Other clay soil removal and/or anti redeposition agents known in the art can also be utilized in the compositions herein. Another type of preferred antiredeposition agent includes the carboxy methyl cellulose (CMC) materials. These materials are well known in the art.

Polymeric Dispersing Agents

Polymeric dispersing agents can advantageously be utilized at levels from about 0.1% to about 7%, by weight, in the compositions herein, especially in the presence of zeolite and/or layered silicate builders. Suitable polymeric dispersing agents include polymeric polycarboxylates and polyethylene glycols, although others known in the art can also be used. It is believed, though it is not intended to be limited by theory, that polymeric dispersing agents enhance overall detergent builder performance, when used in combination with other builders (including lower molecular weight polycarboxylates) by crystal growth inhibition, particulate soil release peptization, and anti-redeposition.

Polymeric polycarboxylate materials can be prepared by polymerizing or copolymerizing suitable unsaturated monomers, preferably in their acid form. Unsaturated monomeric acids that can be polymerized to form suitable polymeric polycarboxylates include acrylic acid, maleic acid (or maleic anhydride), fumaric acid, itaconic acid, aconitic acid, mesaconic acid, citraconic acid and methylenemalonic acid. The presence in the polymeric polycarboxylates herein or monomeric segments, containing no carboxylate radicals such as vinylmethyl ether, styrene, ethylene, etc. is suitable provided that such segments do not constitute more than about 40% by weight.

Particularly suitable polymeric polycarboxylates can be derived from acrylic acid. Such acrylic acid-based polymers which are useful herein are the water-soluble salts of polymerized acrylic acid. The average molecular weight of such polymers in the acid form preferably ranges from about 2,000 to 10,000, more preferably from about 4,000 to 7,000 and most preferably from about 4,000 to 5,000. Water-soluble salts of such acrylic acid polymers can include, for example, the alkali metal, ammonium and substituted ammonium salts. Soluble polymers of this type are known materials. Use of polyacrylates of this type in detergent compositions has been disclosed, for example, in Diehl, U.S. Pat. No. 3,308,067, issued Mar. 7, 1967.

Acrylic/maleic-based copolymers may also be used as a preferred component of the dispersing/anti-redeposition agent. Such materials include the water-soluble salts of copolymers of acrylic acid and maleic acid. The average molecular weight of such copolymers in the acid form preferably ranges from about 2,000 to 100,000, more preferably from about 5,000 to 75,000, most preferably from about 7,000 to 65,000. The ratio of acrylate to maleate segments in such copolymers will generally range from about 30:1 to about 1:1, more preferably from about 10:1 to 2:1. Water-soluble salts of such acrylic acid/maleic acid copolymers can include, for example, the alkali metal, ammonium and substituted ammonium salts. Soluble acrylate/maleate copolymers of this type are known materials which are described in European Patent Application No. 66915, published Dec. 15, 1982, as well as in EP 193,360, published Sep. 3, 1986, which also describes such polymers comprising hydroxypropylacrylate. Still other useful dispersing agents include the maleic/acrylic/vinyl alcohol terpolymers. Such materials are also disclosed in EP 193,360, including, for example, the 45/45/10 terpolymer of acrylic/maleic/vinyl alcohol.

Another polymeric material which can be included is polyethylene glycol (PEG). PEG can exhibit dispersing agent performance as well as act as a clay soil removal-antideposition agent. Typical molecular weight ranges for these purposes range from about 500 to about 100,000, preferably from about 1,000 to about 50,000, more preferably from about 1,500 to about 10,000.

Polyaspartate and polyglutamate dispersing agents may also be used, especially in conjunction with zeolite builders. Dispersing agents such as polyaspartate preferably have a molecular weight (avg.) of about 10,000.

Brightener

Any optical brighteners or other brightening or whitening agents known in the art can be incorporated at levels typically from about 0.05% to about 1.2%, by weight, into the detergent compositions herein. Commerical optical brighteners which may be useful in the present invention can be classified into subgroups, which include, but are not necessarily limited to, derivatives of stilbene, pyrazoline, coumarin, carboxylic acid, methinecyanines, dibenzothiphene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published by John Wiley & Sons, New York (1982).

Specific examples of optical brighteners which are useful in the present compositions are those identified in U.S. Pat. No. 4,790,856, issued to Wixon on Dec. 13, 1988. These brighteners include the PHORWHITE series of brighteners from Verona. Other brighteners disclosed in this reference include: Tinopal UNPA, Tinopal CBS and Tinopal 5BM; available from Ciba-Geigy; Artic White CC and Artic White CWD, available from Hilton-Davis, located in Italy; the 2-(4-stryl-phenyl)-2H-napthol[1,2-d]triazoles; 4,4'-bis- (1,2, 3-triazol-2-yl)-stil- benes; 4,4'-bis(stryl)bisphenyls; and the aminocoumarins. Specific examples of these brighteners include 4-methyl-7-diethyl-amino coumarin; 1,2-bis(-venzimidazol-2-yl)ethylene; 1,3-diphenyl-phrazolines; 2,5-bis(benzoxazol-2-yl)thiophene; 2-stryl-napth-[1,2-d] oxazole; and 2-(stilbene-4-yl)-2H-naphtho- [1,2-d]triazole. See also U.S. Pat. No. 3646,015, issued Feb. 29, 1972 to Hamilton. Anionic brighteners are preferred herein.

Suds Suppressors

Compounds for reducing or suppressing the formatin of suds can be incorporated into the compositions of the present invention. Suds suppression can be of particular importance in the so-called "high concentration cleaning process" as described in U.S. Pat. Nos. 4,489,455 and 4,489,574 and in front-loading European-style washing machines.

A wide variety of materials may be used as suds suppressors, and suds suppressors are well known to those skilled in the art. See, for example, Kirk Othmer Encyclopedia of Chemical Technology, Third Edition, Volume 7, pages 430–447 (John Wiley & Sons, Inc., 1979). One category of suds suppressor of particular interest encompasses monocarboxylic fatty acid and soluble salts therein. See U.S. Pat. No. 2,954,347, issued Sep. 27, 1960 to Wayne St. John. The monocarboxylic fatty acids and salts thereof used as suds suppressor typically have hydrocarbyl chains of 10 to about 24 carbon atoms, preferably 12 to 18 carbon atoms. Suitable salts include the alkali metal salts such as sodium, potassium, and lithium salts, and ammonium and alkanolammonium salts.

The detergent compositions herein may also contain non-surfactant suds suppressors. These include, for example: high molecular weight hydrocarbons such as paraffin, fatty acid esters (e.g., fatty acid triglycerides), fatty acid esters of monovalent alcohols, aliphatic $C_{18}$–$C_{40}$ ketones (e.g., stearone), etc. Other suds inhibitors include N-alkylated amino triazines such as tri- to hexa-alkylmelamines or di- to tetra-alkyldiamine chlortriazines formed as products of cyanuric chloride with two or three moles of a primary or secondary amine containing 1 to 24 carbon atoms, propylene oxide, and monostearyl phosphates such as monostearyl alcohol phosphate ester and monostearyl di-alkali metal (e.g., K, Na, and Li) phosphates and phosphate esters. The hydrocarbons such as paraffin and haloparaffin can be utilized in liquid form. The liquid hydrocarbons will be liquid at room temperature and atmospheric pressure, and will have a pour point in the range of about −40° C. and about 50° C., and a minimum boiling point not less than about 110° C. (atmospheric pressure). It is also known to utilize waxy hydrocarbons, preferably having a melting point below about 100° C. The hydrocarbons constitute a preferred category of suds suppressor for detergent compositions. Hydrocarbon suds suppressors are described, for example, in U.S. Pat. No. 4,265,779, issued May 5, 1981 to Gandolfo et al. The hydrocarbons, thus, include aliphatic, alicyclic, aromatic, and heterocyclic saturated or unsaturated hydrocarbons having from about 12 to about 70 carbon atoms. The term "paraffin," as used in this suds suppressor discussion, is intended to include mixtures of true paraffins and cyclic hydrocarbons.

Another preferred category of non-surfactant suds suppressors comprises silicone suds suppressors. This category includes the use of polyorganosiloxane oils, such as polydimethylsiloxane, dispersions or emulsions of polyorganosiloxane oils or resins, and combinations of polyorganosiloxane with silica particles wherein the polyorganosiloxane is chemisorbed or fused onto the silica. Silicone suds suppressors are well known in the art and are, for example, disclosed in U.S. Pat. No. 4,265,779, issued May 5, 1981 to Gandolfo et al and European Patent Application No. 89307851.9, published Feb. 7, 1990, by Starch, M. S.

Other silicone suds suppressors are disclosed in U.S. Pat. No. 3,455,839 which relates to compositions and processes for defoaming aqueous solutions by incorporating therein small amounts of polydimethylsiloxane fluids.

Mixtures of silicone and silanated silica are described, for instance, in German Patent Application DOS 2,124,526. Silicone defoamers and suds controlling agents in granular detergent compositions are disclosed in U.S. Pat. No. 3,933, 672, Bartolotta et al, and in U.S. Pat. No. 4,652,392, Baginski et al, issued Mar. 24, 1987.

An exemplary silicone based suds suppressor for use herein is a suds suppressing amount of a suds controlling agent consisting essentially of:

(i) polydimethylsiloxane fluid having a viscosity of from about 20 cs. to about 1,500 cs. at 25° C.;

(ii) from about 5 to about 50 parts per 100 parts by weight of (i) of siloxane resin composed of $(CH_3)_3SiO_{1/2}$ units of $SiO_2$ units in a ratio of from $(CH_3)_3 SiO_{1/2}$ units and to $SiO_2$ units of from about 0.6:1 to about 1.2:1; and (iii) from about 1 to about 20 parts per 100 parts by weight of (i) of a solid silica gel.

In the preferred silicone suds suppressor used herein, the solvent for a continuous phase is made up of certain polyethylene glycols or polyethylene-polypropylene glycol copolymers or mixtures thereof (preferred), or polypropylene glycol. The primary silicone suds suppressor is branched/crosslinked and preferably not linear.

To illustrate this point further, typical liquid laundry detergent compositions with controlled suds will optionally comprise from about 0.001 to about 1, preferably from about 0.01 to about 0.7, most preferably from about 0.05 to about 0.5, weight % of said silicone suds suppressor, which comprises (1) a nonaqueous emulsion of a primary antifoam agent which is a mixture of (a) a polyorganosiloxane, (b) a resinous siloxane or a silicone resin-producing silicone compound, (c) a finely divided filler material, and (d) a catalyst to promote the reaction of mixture components (a), (b) and (c), to form silanolates; (2) at least one nonionic silicone surfactant; and (3) polyethylene glycol or a copolymer of polyethylene-polypropylene glycol having a solubility in water at room temperature of more than about 2 weight %; and without polypropylene glycol. Similar amounts can be used in granular compositions, gels, etc. See also U.S. Pat. Nos. 4,978,471, Starch, issued Dec. 18, 1990, and 4,983,316, Starch issued Jan. 8, 1991, 5,288,431, Huber et al., issued Feb. 22, 1994, and U.S. Pat. Nos. 4,639,489 and 4,749,740, Aizawa et al at column 1, line 46 through column 4, line 35.

The silicone suds suppressor herein preferably comprises polyethylene glycol and a copolymer of polyethylene glycol/polypropylene glycol, all having an average molecular weight of less than about 1,000, preferably between about 100 and 800. The polyethylene glycol and polyethylene/polypropylene copolymers herein have a solubility in water at room temperature of more than about 2 weight %, preferably more than about 5 weight %.

The preferred solvent herein is polyethylene glycol having an average molecular weight of less than about 1,000, more preferably between about 100 and 800, most preferably between 200 and 400, and a copolymer of polyethylene glycol/polypropylene glycol, preferably PPG 200/PEG 300. Preferred is a weight ratio of between about 1:1 and 1:10, most preferably between 1:3 and 1:6, of polyethylene glycol:copolymer of polyethylene-polypropylene glycol.

The preferred silicone suds suppressors used herein do not contain polypropylene glycol, particularly of 4,000 molecular weight. They also preferably do not contain block copolymers of ethylene oxide and propylene oxide, like PLURONIC L101.

Other suds suppressors useful herein comprise the secondary alcohols (e.g., 2-alkyl alkanols) and mixtures of such alcohols with silicone oils, such as the silicones disclosed in U.S. Pat. Nos. 4,798,679, 4,075,118 and EP 150,872. The secondary alcohols include the $C_6$–$C_{16}$ alkyl alcohols having a $C_1$–$C_{16}$ chain. A preferred alcohol is 2-butyl octanol, which is available from Condea under the trademark ISOFOL 12. Mixtures of secondary alcohols are available under the trademark ISALCHEM 123 from Enichem. Mixed suds suppressors typically comprise mixtures of alcohol+silicone at a weight ratio of 1:5 to 5:1.

For any detergent compositions to be used in automatic laundry washing machines, suds should not form to the extent that they overflow the washing machine. Suds suppressors, when utilized, are preferably present in a "suds suppressing amount." By "suds suppressing amount" is meant that the formulator of the composition can select an amount of this suds controlling agent that will sufficiently control the suds to result in a low-sudsing laundry detergent for use in automatic laundry washing machines.

The compositions herein will generally comprise from 0% to about 5% of suds suppressor. When utilized as suds suppressors, monocarboxylic fatty acids, and salts therein, will be present typically in amounts up to about 5%, by weight, of the detergent composition. Preferably, from about 0.5% to about 3% of fatty monocarboxylate suds suppressor is utilized. Silicone suds suppressors are typically utilized in amounts up to about 2.0%, by weight, of the detergent composition, although higher amounts may be used. This upper limit is practical in nature, due primarily to concern with keeping costs minimized and effectiveness of lower amounts for effectively controlling sudsing. Preferably from about 0.01% to about 1% of silicone suds suppressor is used, more preferably from about 0.25% to about 0.5%. As used herein, these weight percentage values include any silica that may be utilized in combination with polyorganosiloxane, as well as any adjunct materials that may be utilized. Monostearyl phosphate suds suppressors are generally utilized in amounts ranging from about 0.1% to about 2%, by weight, of the composition. Hydrocarbon suds suppressors are typically utilized in amounts ranging from about 0.01% to about 5.0%, although higher levels can be used. The alcohol suds suppressors are typically used at 0.2%–3% by weight of the finished compositions.

Fabric Softeners

Various through-the-wash fabric softeners, especially the impalpable smectite clays of U.S. Pat. No. 4,062,647, Storm and Nirschl, issued Dec. 13, 1997, as well as other softener clays known in the art, can optionally be used typically at levels of from about 0.5% to about 10% by weight in the present compositions to provide fabric softener benefits concurrently with fabric cleaning. Clay softeners can be used in combination with amine and cationic softeners as disclosed, for example, in U.S. Pat. No. 4,375,416, Crisp et al, Mar. 1, 1983 and U.S. Pat. No. 4,291,071, Harris et al, issued Sep. 22, 1981.

Dye Transfer Inhibiting Agents

The compositions of the present invention may also include one or more materials effective for inhibiting the transfer of dyes from one fabric to another during the cleaning process. Generally, such dye transfer inhibiting agents include polyvinyl pyrrolidone polymers, polyamine N-oxide polymers, copolymers of N-vinylpyrrolidone and N-vinylimidazole, manganese phthalocyanine, peroxidases, and mixtures thereof. If used, these agents typically comprise from about 0.01% to about 10% by weight of the composition, preferably from about 0.01% to about 5%, and more preferably from about 0.05% to about 2%.

More specifically, the polyamine N-oxide polymers preferred for use herein contain units having the following structural formula: R—$A_x$—P; wherein P is a polymerizable unit to which and N—O group can be attached or the N—O group can form part of the polymerizable unit or the N—O group can be attached to both units; A is one of the following structures: —NC(O)—, —C(O)O—, —S—, —O—, —N=;

x is 0 or 1; and R is aliphatic, ethoxylated aliphatics, aromatics, heterocyclic or alicyclic groups or any combination thereof to which the nitrogen of the N—O group can be attached or the N—O group is part of these groups. Preferred polyamine N-oxides are those wherein R is a heterocyclic group such as pyridine, pyrrole, imidazole, pyrrolidine, piperidine and derivatives thereof.

The N—O group can be represented by the following general structures:

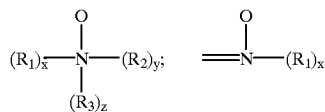

wherein $R_1$, $R_2$, $R_3$ are aliphatic, aromatic, heterocyclic of alicyclic groups or combinations thereof; x, y and z are 0 or 1; and the nitrogen of the N—O group can be attached or form part of any of the aforementioned groups. The amine oxide unit of the polyamine N-oxides has a pKa<10, preferably pKa<7, more preferred pKa<6.

Any polymer backbone can be used as long as the amine oxide polymer formed is water-soluble and has dye transfer inhibiting properties. Examples of suitable polymeric backbones are polyvinyls, polyalkylenes, polyesters, polyethers, polyamide, polyimides, polyacrylates and mixtures thereof. These polymers include random or block copolymers where one monomer type is an amine N-oxide and the other monomer type is an N-oxide. The amine N-oxide polymers typically have a ratio of amine to the amine N-oxide of 10:1 to 1:1,000,000. However, the number of amine oxide groups present in the polyamine oxide polymer can be varied by appropriate copolymerization or by an appropriate degree of N-oxidation. The polyamine oxides can be obtained in almost any degree of polymerization. Typically, the average molecular weight is within the range of 500 to 1,000,000; more preferred 1,000 to 500,000; most preferred 5,000 to 100,000. This preferred class of materials can be referred to as "PVNO".

The most preferred polyamine N-oxide useful in the detergent compositions herein is poly(4-vinylpyridine-N-oxide) which as an average molecular weight of about 50,000 and an amine to amine N-oxide ratio of about 1:4.

Copolymers of N-vinylpyrrolidone and N-vinylimidazole polymers (referred to as a class as "PVPVI") are also preferred for use herein. Preferably the PVPVI has an average molecular weight range from 5,000 to 1,000,000, more preferably from 5,000 to 200,000, and most preferably from 10,000 to 20,000. (The average molecular weight range is determined by light scattering as described in Barth, et al., Chemical Analysis, Vol. 113. "modern Methods of Polymer Characterization", the disclosures of which are incorporated herein by reference.) The PVPVI copolymers typically have a molar ratio of N-vinylimidazole to N-vinylpyrrolidone from 1:1 to 0.2:1, more preferably from 0.8:1 to 0.3:1, most preferably from 0.6:1 to 0.4:1. These copolymers can be either linear or branched.

The present invention compositions also may employ a polyvinylpyrrolidone ("PVP") having an average molecular weight of from about 5,000 to about 400,000, preferably from about 5,000 to about 200,000, and more preferably from about 5,000 to about 50,000. PVP's are known to persons skilled in the detergent field; see, for example, EP-A-262,897 and EP-A-256,696, incorporated herein by reference. Compositions containing PVP can also contain polyethylene glycol ("PEG") having an average molecular weight from about 500 to about 100,000, preferably from about 1,000 to about 10,000. Preferably, the ratio of PEG to PVP on a ppm basis delivered in wash solutions is from about 2:1 to about 50:1, and more preferably from about 3:1 to about 10:1.

The detergent compositions herein may also optionally contain from about 0.005% to 5% by weight of certain types of hydrophilic optical brighteners which also provide a dye transfer inhibition action. If used, the composition herein will preferably comprise from about 0.1% to 1% by weight of such optical brighteners.

The hydrophilic optical brighteners useful in the present invention are those having the structural formula:

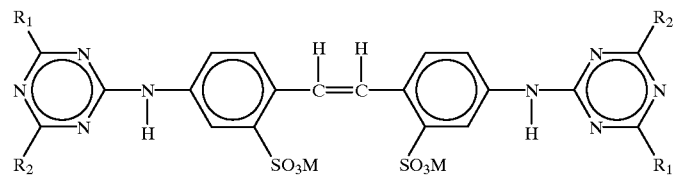

wherein $R_1$ is selected from anilino, N-2-bis-hydroxyethyl and NH-2-hydroxyethyl; $R_2$ is selected from N-2-bis-hydroxyethyl, N-2-hydroxyethyl-N-methylamino, morphilino, chloro and amino; and M is a salt-forming cation such as sodium or potassium.

When in the above formula, $R_1$ is anilino, $R_2$ is N-2-bis-hydroxyethyl and M is a cation such as sodium, the brightener is 4,4',-bis[(4-anilino-6-(N-2-bis-hydroxyethyl)-s-triazine-2-yl)amino]-2,2'-stilbenedisulfonic acid and disodium salt. This particular brightener species is commercially marketed under the tradename Tinopal-UNPA-GX by Ciba-Geigy Corporation. Tinopal-UNPA-GX is the preferred hydrophilic optical brightener useful in the detergent compositions herein.

When in the above formula, $R_1$ is anilino, $R_2$ is N-2-hydroxyethyl-N-2-methylamino and M is a cation such as sodium, the brightener is 4,4'-bis[(4-anilino-6-(N-2-hydroxyethyl-N-methylamino)-s-triazine-2-yl)amino]2,2'-stilbenedisulfonic acid disodium salt. This particular brightener species is commercially marketed under the tradename Tinopal 5BM-GX by Ciba-Geigy Corporation.

When in the above formula, $R_1$ is anilino, $R_2$ is morphilino and M is a cation such as sodium, the brightener is 4,4'-bis[(4-anilino-6-morphilino-s-triazine-2-yl)amino]2,2'-stilbenedisulfonic acid, sodium salt. This particular brightener species is commercially marketed under the tradename Tinopal AMS-GX by Ciba Geigy Corporation.

The specific optical brightener species selected for use in the present invention provide especially effective dye transfer inhibition performance benefits when used in combination with the selected polymeric dye transfer inhibiting agents hereinbefore described. The combination of such selected polymeric materials (e.g., PVNO and/or PVPVI) with such selected optical brighteners (e.g., Tinopal UNPA-GS, Tinopal 5BM-GX and/or Tinopal AMS-GX) provides significantly better dye transfer inhibition in aqueous wash solutions than does either of these two detergent composition components when used alone. Without being bound by theory, it is believed that such brighteners work this way because they have high affinity for fabrics in the wash solution and therefore deposit relatively quick on these fabrics. The extent to which brighteners deposit on fabrics in the wash solution can be defined by a parameter called the "exhaustion coefficient". The exhaustion coefficient is in general as the ratio of a) the brightener material deposited on fabric to b) the initial brightener concentration in the wash liquor. Brighteners with relatively high exhaustion coefficients are the most suitable for inhibiting dye transfer in the context of the present invention.

Of course, it will be appreciated that other, conventional optical brightener types of compounds can optionally be used in the present compositions to provide conventional fabric "brightness" benefits, rather than a true dye transfer inhibiting effect. Such usage is conventional and well-known to detergent formulations.

The modified polyamines of the present invention useful as cotton soil release agents are suitably prepared by the following methods.

EXAMPLE 2

Reaction of Tetraethylenepentamine with Epichlorohydrin

To a 250 ml three-neck round bottom flask equipped with a magnetic stirring bar, condenser, addition funnel, thermometer, and temperature-controlling device (Thermowatch, $I^2R$) is added tetraethylenepentamine (25.0 g, 0.132 mol) and methanol (60 g, 1.87 mol). This solution is heated to reflux under argon, and epichlorohydrin (24.9 g, 0.269 mol) is weighed into the addition funnel and added dropwise. After about half of the epichlorohydrin is added, the solution begins to look hazy. Addition is stopped, and the solution is heated at reflux overnight. A $^{13}$C-NMR ($D_2O$) and is taken, which shows the absence of an epichlorohydrin peak at ~45 ppm. The remaining epichlorohydrin is added, and the solution is heated at reflux overnight. A $^{13}$C-NMR ($D_2O$) again shows no remaining epichlorohydrin. The methanol is removed on a Kugelrohr apparatus (Aldrich) at about 80° C. to afford 40.2 g of sticky yellow solid. The material is almost all soluble in water but on standing separates a small amount of gelatinous material. Size exclusion chromatography indicates that the material has a broad molecular weight distribution. Prior to ethoxylation, it is rigorously dried under vacuum at 130° C.

EXAMPLE 3

Preparation of 6 Unit Hexaethyleneheptamine Backbone Linked by 2-hydroxypropyl Units To a 1000 mL round bottom flask equipped with an overheat stirrer, temperature control unit (Thermowatch, $I^2$-R) and argon inlet tube is charged hexaethyleneheptamine (27.5 gm, 0.10 mole) and methanol (500 mL). Epichlorohydrin (77.1 gm, 0.083 mole) is added dropwise with sufficient stirring. The reaction solution is refluxed and the reaction completion is determined by the complete disappearance of the oxirane ring carbon $^{13}$C NMR resonance. Several milligrams of tetrabutylammonium hydroxide phase transfer catalyst is added followed by KOH (4.0 gm, 0.10 mole) as a 40% aqueous solution. The thickened two phase solution is diluted with water (100 mL) and the phases separated. The reaction is allowed to dry over $Na_2SO_4$, the solvent is removed by rotary evaporation and the coupled heptamine backbone is used without further purification.*
Prior to further use, it is rigorously dried under vacuum at 130° C.

*If necessary, the number of heptamine blocks that comprise the backbone can be determined by NMR analysis of the number of primary amine moieties present.

EXAMPLE 4

Mono-ethoxylation of 2-hydroxypropyl-linked-tetraethylenepentamine Backbone

The ethoxylation is conducted in a 2 gallon stirred stainless steel autoclave equipped for temperature measurement and control, pressure measurement, vacuum and inert gas purging, sampling, and for introduction of ethylene oxide as a liquid. A ~20 lb. net cylinder of ethylene oxide (ARC) is set up to deliver ethylene oxide as a liquid by a pump to the autoclave with the cylinder placed on a scale so that the weight change of the cylinder could be monitored.

A 1500 g portion of 2-hydroxypropyl-linked-tetraethylenepentamine backbone (comprising a mixture of tetraethylenepentamine units linked with 2-hydroxypropyl units) is added to the autoclave. The autoclave is then sealed and purged of air (by applying vacuum to minus 28" Hg followed by pressurization with nitrogen to 250 psia, then venting to atmospheric pressure). The autoclave contents are heated to 130° C. while applying vacuum. After about one hour, the autoclave is charged with nitrogen to about 250 psia while cooling the autoclave to about 105° C. Ethylene oxide is then added to the autoclave incrementally over time while closely monitoring the autoclave pressure, temperature, and ethylene oxide flow rate. The ethylene oxide pump is turned off and cooling is applied to limit any temperature increase resulting from any reaction exotherm. The temperature is maintained between 100 and 110° C. while the total pressure is allowed to gradually increase during the course of the reaction. After a total of 1800 grams of ethylene oxide has been charged to the autoclave, the temperature is increased to 110° C. and the autoclave is allowed to stir for an additional hour. At this point, vacuum is applied to remove any residual unreacted ethylene oxide.

The reaction mixture is then deodorized by passing about 100 cu. ft. of inert gas (argon or nitrogen) through a gas dispersion frit and through the reaction mixture while agitating and heating the mixture to 130° C. This mono-ethoxylated mixture of tetraethylenepentamine units connected by 2-hydroxypropyl units is suitable for use as is as a non-cotton soil release agent according to the present invention or may be further modified.

EXAMPLE 5

General Procedure for Ethoxylation of 2-hydroxypropyl-linked-tetraethylenepentamine Backbone The ethoxylation is conducted in a 2 gallon stirred stainless steel autoclave equipped for temperature measurement and control, pressure measurement, vacuum and inert gas purging, sampling, and for introduction of ethylene oxide as a liquid. A ~20 lb. net cylinder of ethylene oxide (ARC) is set up to deliver ethylene oxide as a liquid by a pump to the autoclave with the cylinder placed on a scale so that the weight change of the cylinder could be monitored.

A 1170 g portion of 2-hydroxypropyl-linked-tetraethylenepentamine backbone (comprising a mixture of tetraethylenepentamine units linked with 2-hydroxypropyl units having an average of five tetraethylenepentamine blocks linked by 2-propyl units) is added to the autoclave. The autoclave is then sealed and purged of air (by applying vacuum to minus 28" Hg followed by pressurization with nitrogen to 250 psia, then venting to atmospheric pressure). The autoclave contents are heated to 130° C. while applying vacuum. After about one hour, the autoclave is charged with nitrogen to about 250 psia while cooling the autoclave to about 105° C. Ethylene oxide is then added to the autoclave incrementally over time while closely monitoring the autoclave pressure, temperature, and ethylene oxide flow rate. The ethylene oxide pump is turned off and cooling is applied to limit any temperature increase resulting from any reaction exotherm. The temperature is maintained between 100 and 110° C. while the total pressure is allowed to gradually increase during the course of the reaction. After a total of 1800 grams of ethylene oxide has been charged to the autoclave, the temperature is increased to 110° C. and the autoclave is allowed to stir for an additional hour. At this point, vacuum is applied to remove any residual unreacted ethylene oxide.

The reaction mixture is then deodorized by passing about 100 cu. ft. of inert gas (argon or nitrogen) through a gas dispersion frit and through the reaction mixture while agitating and heating the mixture to 130° C.

Next, vacuum is continuously applied while the autoclave is cooled to about 50° C. while introducing sufficient sodium methoxide in methanol solution to achieve a 10% catalyst loading based upon the total number of nitrogen and hydroxy functions (in this example, 27 moles of —NH's and 4 moles of —OH's are present on average and therefore 3.1 moles of sodium methoxide is used.). The methoxide solution is sucked into the autoclave under vacuum and then the autoclave temperature controller setpoint is increased to 130° C. A device is used to monitor the power consumed by the agitator. The agitator power is monitored along with the temperature and pressure. Agitator power and temperature values gradually increase as methanol is removed from the autoclave and the viscosity of the mixture increases and stabilizes in about 1 hour indicating that most of the methanol has been removed. The mixture is further heated and agitated under vacuum for an additional 30 minutes.

Vacuum is removed and the autoclave is cooled to 105° C. while it is being charged with nitrogen to 250 psia and then vented to ambient pressure. The autoclave is charged to 200 psia with nitrogen. Ethylene oxide (8360 gm) is again added to the autoclave incrementally as before while closely monitoring the autoclave pressure, temperature, and ethylene oxide flow rate while maintaining the temperature between 100 and 110° C. and limiting any temperature increases due to reaction exotherm. After the addition of the theoretical amount of ethylene oxide to form 6 additional ethyleneoxy units per —NH unit and 7 ethyleneoxy units per —OH unit is achieved over several hours, the temperature is increased to 110° C. and the mixture stirred for an additional hour.

The reaction mixture is then collected in nitrogen purged containers and eventually transferred into a 22 L three neck round bottomed flask equipped with heating and agitation. The strong alkali catalyst is neutralized by adding methanesulfonic acid until neutral by pH paper. The reaction mixture is then deodorized by passing about 100 cu. ft. of inert gas (argon or nitrogen) through a gas dispersion frit and through the reaction mixture while agitating and heating the mixture to 130° C.

The final reaction product is cooled slightly and collected in glass containers purged with nitrogen.

In other preparations the neutralization and deodorization is accomplished in the reactor before discharging the product. This material may be used as is as a suitable cotton soil release agent of the present invention or may be further modified.

EXAMPLE 6

Ethoxylation of 2-hydroxypropyl-linked-hexaethyleneheptamine Backbone

The ethoxylation is conducted in a 2 gallon stirred stainless steel autoclave equipped for temperature measurement and control, pressure measurement, vacuum and inert gas purging, sampling, and for introduction of ethylene oxide as a liquid. A ~20 lb. net cylinder or ethylene oxide (ARC) is set up to deliver ethylene oxide as a liquid by a pump to the autoclave with the cylinder placed on a scale so that the weight change of the cylinder could be monitored.

A 2100 g portion of 2-hydroxypropyl-linked-hexaethyleneheptamine backbone (comprises 6 equivalents of hexaethyleneheptamine linked with 5 equivalents of 2-hydroxypropyl units equating to 43 moles of nitrogen functions per moles and 5 hydroxy functions) is added to the autoclave. The autoclave is then sealed and purged of air (by applying vacuum to minus 28" Hg followed by pressurization with nitrogen to 250 psia, then venting to atmospheric pressure). The autoclave contents are heated to 130° C. while applying vacuum. After about one hour, the autoclave is charged with nitrogen to about 250 psia while cooling the autoclave to about 105° C. Ethylene oxide is then added to the autoclave incrementally over time while closely monitoring the autoclave pressure, temperature, and ethylene oxide flow rate. The ethylene oxide pump is turned off and cooling is applied to limit any temperature increase resulting from any reaction exotherm. The temperature is maintained between 100 and 110° C. while the total pressure is allowed to gradually increase during the course of the reaction. After a total of 1800 grams of ethylene oxide has been charged to the autoclave (roughly equivalent to one mole ethylene oxide per PEI nitrogen function), the temperature is increased to 110° C. and the autoclave is allowed to stir for an additional hour. At this point, vacuum is applied to remove any residual unreacted ethylene oxide.

The reaction mixture is then deodorized by passing about 100 cu. ft. of inert gas (argon or nitrogen) through a gas dispersion frit and through the reaction mixture while agitating and heating the mixture to 130° C.

Next, vacuum is continuously applied while the autoclave is cooled to about 50° C. while introducing 420 g of a 25% sodium methoxide in methanol solution (1.94 moles, to achieve a 10% catalyst loading based upon the total number of nitrogen and hydroxy functions). The methoxide solution is sucked into the autoclave under vacuum and then the autoclave temperature controller setpoint is increased to 130° C. A device is used to monitor the power consumed by the agitator. The agitator power is monitored along with the temperature and pressure. Agitator power and temperature values gradually increase as methanol is removed from the autoclave and the viscosity of the mixture increases and stabilizes in about 1 hour indicating that most of the methanol has been removed. The mixture is further heated and agitated under vacuum for an additional 30 minutes.

Vacuum is removed and the autoclave is cooled to 105° C. while it is being charged with nitrogen to 250 psia and then vented to ambient pressure. The autoclave is charged to 200 psia with nitrogen. Ethylene oxide is again added to the autoclave incrementally as before while closely monitoring the autoclave pressure, temperature, and ethylene oxide flow rate while maintaining the temperature between 100 and 110° C. and limiting any temperature increases due to reaction exotherm. After the addition of 5100 g of ethylene oxide (resulting in a total of approximately 7 moles of ethylene oxide per mole of substitutable sights, 43 nitrogen functions and 5 hydroxy functions) is achieved over several hours, the temperature is increased to 110° C. and the mixture stirred for an additional hour.

The reaction mixture is then collected in nitrogen purged containers and eventually transferred into a 22 L three neck round bottomed flask equipped with heating and agitation. The strong alkali catalyst is neutralized by adding 167 g methanesulfonic acid (1.94 moles). The reaction mixture is then deodorized by passing about 100 cu. ft. of inert gas (argon or nitrogen) through a gas dispersion frit and through the reaction mixture while agitating and heating the mixture to 130° C.

The final reaction product is cooled slightly and collected in glass containers purged with nitrogen.

In other preparations the neutralization and deodorization is accomplished in the reactor before discharging the product. This material may be used as is as a suitable cotton soil release agent of the present invention or may be further modified.

EXAMPLE 7

Quaternization of (tetraethylenepentamine)$_5$-(2-hydroxypropyl)$_4$E$_7$

To a 500 mL Erlenmeyer flask equipped with a magnetic stirring bar is added (108 gm, 0.01 mole) of the polyamine comprising an average of 5 tetraethylene-pentamine blocks wherein each block is connected by a 2-hydroxypropyl unit (prepared as in Example 1) wherein each substitutable backbone site (27 —NH sites+4 —OH sites) is ethoxylated to an average of 7 ethyleneoxy units per site, the ethoxylated material having an average molecular weight of 10,767 and acetonitrile (120 g). This material comprises an average 0.25 moles of quaternizable nitrogen atoms per mole of polymer. Dimethyl sulfate (14.1 g, 0.112 mol) is added in one portion to the rapidly stirring solution, which is then stoppered and stirred at room temperature overnight. The acetonitrile is removed by rotary evaporation at about 60° C., followed by further stripping of solvent using a Kugelrohr apparatus at approximately 80° C. to afford 113 g of the desired partially quaternized material as a dark brown viscous liquid. The $^{13}$C-NMR (D$_2$O) spectrum obtained on a sample of the reaction product indicates the absence of a carbon resonance at ~58 ppm corresponding to dimethyl sulfate. The $^1$H-NMR (D$_2$O) spectrum shows a partial shifting of the resonance at about 2.5 ppm for methylenes adjacent to unquaternized nitrogen has shifted to approximately 3.0 ppm. This is consistent with the desired quaternization of about 40% of the nitrogens.

EXAMPLE 8

Formation of Amine Oxide of (Tetraethylenepentamine)$_5$-(2-hydroxypropyl)$_4$E$_7$ To a 500 mL Erlenmeyer flask equipped with a magnetic stirring bar is added (108 gm, 0.01 mole) of the polyamine comprising an average of 5 tetraethylene-pentamine blocks wherein each block is connected by a 2-hydroxypropyl unit (prepared as in Example 1) wherein each substitutable backbone site (27 —NH site+4 —OH sites) is ethoxylated to an average of 7 ethyleneoxy units per site, the ethoxylated material having an average molecular weight of 10,767. This material comprises an average 0.25 moles of oxidizable nitrogen atoms per mole of polymer. To this material is added hydrogen peroxide (50 g of a 30 wt % solution in water, 0.45 mol), the flask is stoppered and after an initial exotherm the solution is stirred at room temperature overnight. $^1$H-NMR (D$_2$O) spectrum obtained on a sample of the reaction mixture indicates complete conversion. The resonances ascribed to methylene protons adjacent to unoxidized nitrogens have shifted from the original position at ~2.5 ppm to ~3.5 ppm. To the reaction solution is added approximately 5 g of 0.5% Pd on alumina pellets, and the solution is allowed to stand at room temperature for approximately 3 days. The solution is tested and found to be negative for peroxide by indicator paper. The material as obtained is suitably stored as a 51.1% active solution in water.

EXAMPLE 9

Formation of Amine Oxide of Quaternized (Tetraethylenepentamine)$_5$-(2-hydroxypropyl)$_4$E$_7$ To a 500 mL Erlenmeyer flask equipped with a magnetic stirring bar is added (87.4 gm, 0.008 mole) of the polyamine comprising an average of 5 tetraethylene-pentamine blocks wherein each block is connected by a 2-hydroxypropyl unit (prepared as in Example 1) wherein each substitutable backbone site (27 —NH sites+4 —OH sites) is ethoxylated to an average of 7 ethyleneoxy units per site, the ethoxylated material having an average molecular weight of 10,767, which is then further modified by quaternization to approximately 40% with dimethyl sulfate (as in Example 6) to an average molecular weight of approximately 10,927. To this material is added hydrogen peroxide (48 g of a 30 wt % solution in water, 0.42 mol), and water (~50 g). The flask is stoppered, and after an initial exotherm the solution is stirred at room temperature overnight. $^1$H-NMR (D$_2$O) spectrum obtained on a sample taken from the reaction mixture indicates complete conversion of the resonances attributed to the methylene peaks previously observed in the range of 2.5–3.0 ppm to a material having methylenes with a chemical shift of approximately 3.7 ppm. To the reaction solution is added approximately 5 g of 0.5% Pd on alumina pellets, and the solution is allowed to stand at room temperature for approximately 3 days. The solution is tested and found to be negative for peroxide by indicator paper. The desired material with ~40% of the nitrogens quaternized and 60% of the nitrogens oxidized to amine oxide is obtained and is suitably stored as a 44.9% active solution in water.

The following describe high density liquid detergent compositions according to the present invention:

TABLE I

| | weight % | |
|---|---|---|
| Ingredients | 10 | 11 |
| Polyhydroxy Coco-Fatty Acid Amide | 3.65 | 3.50 |
| C$_{12}$–C$_{13}$ Alcohol Ethoxylate E$_9$ | 3.65 | 0.80 |
| Sodium C$_{12}$–C$_{15}$ Alcohol Sulfate | 6.03 | 2.50 |
| Sodium C$_{12}$–C$_{15}$ Alcohol Ethoxylate E$_{2.5}$ Sulfate | 9.29 | 15.10 |
| C$_{10}$ Amidopropyl Amine | 0 | 1.30 |

TABLE I-continued

| Ingredients | weight % | |
|---|---|---|
| | 10 | 11 |
| Citric Acid | 2.44 | 3.0 |
| Fatty Acid ($C_{12}$–$C_{14}$) | 4.23 | 2.00 |
| Ethanol | 3.00 | 2.81 |
| Monoethanolamine | 1.50 | 0.75 |
| Propanediol | 8.00 | 7.50 |
| Boric Acid | 3.50 | 3.50 |
| Tetraethylenepentamine | 0 | 1.18 |
| Sodium Toluene Sulfonate | 2.50 | 2.25 |
| NaOH | 2.08 | 2.43 |
| Minors* | 1.60 | 1.30 |
| Soil Release Polymer** | 0.50 | 0.50 |
| Water | balance | balance |

*Minors - includes optical brightener and enzymes (protease, lipase, cellulase, and amylase).
**Soil release polymer according to Example 6.

Compositions of the present invention are also prepared by preparing high density granular formulas according to this example utilizing the cotton soil release polymers alone or in combination with other soil release polymers.

TABLE II

| Ingredient | weight % | | | |
|---|---|---|---|---|
| | 12 | 13 | 14 | 15 |
| Sodium $C_{11}$–$C_{13}$ alkylbenzenesulfonate | 13.3 | 13.7 | 10.4 | 11.1 |
| Sodium $C_{14}$–$C_{15}$ alcohol sulfate | 3.9 | 4. | 4.5 | 11.2 |
| Sodium $C_{14}$–$C_{15}$ alcohol ethoxylate (0.5) sulfate | 2.0 | 2.0 | 0.0 | 0.0 |
| Sodium $C_{14}$–$C_{15}$ alcohol ethoxylate (6.5) | 0.5 | 0.5 | 0.5 | 1.0 |
| Tallow fatty acid | 0.0 | 0.0 | 0.0 | 1.1 |
| Sodium tripolyphosphate | 0.0 | 41.0 | 0.0 | 0.0 |
| Zeolite A, hydrate (0.1–10 micron size) | 26.3 | 0.0 | 21.3 | 28.0 |
| Sodium carbonate | 23.9 | 12.4 | 25.2 | 16.1 |
| Sodium Polyacrylate (45%) | 3.4 | 0.0 | 2.7 | 3.4 |
| Sodium silicate (1:6 ratio $NaO/SiO_2$)(46%) | 2.4 | 6.4 | 2.1 | 2.6 |
| Sodium sulfate | 10.5 | 10.9 | 8.2 | 15.0 |
| Sodium perborate | 1.0 | 1.0 | 5.0 | 0.0 |
| Poly(ethyleneglycol), MW ~4000 (50%) | 1.7 | 0.4 | 1.0 | 1.1 |
| Citric acid | 0.0 | 0.0 | 3.0 | 0.0 |
| Nonyl ester of sodium p-hydroxybenzene-sulfonate | 0.0 | 0.0 | 5.9 | 0.0 |
| Non-cotton Soil release polymer* | 0.0 | 0.0 | 0.5 | 0.5 |
| Soil release polymer Example 6 | 0.5 | 0.5 | 0.5 | 0.5 |
| Moisture | 7.5 | 3.1 | 6.1 | 7.3 |

*Non-cotton soil release polymer as taught in U.S. Pat. No. 5,415,807, Gosselink, Pan, Kellett and Hall, issued May 16, 1995, disclosed herein above.
Balance to 100% can, for example, include minors like optical brightener, perfume, suds suppresser, soil dispersant, protease, lipase, cellulase, chelating agents, dye transfer inhibiting agents, additional water, and fillers, including $CaCO_3$, talc, silicates, etc.

Aqueous crutcher mixes of heat and alkali stable components of the detergent compositions are prepared and spray-dried and the other ingredients are admixed so that they contain the ingredients tabulated at the levels shown. The soil release agents of the present invention can be, for example, pulverized and admixed in an amount sufficient for use at a level of 0.5% by weight in conjunction with the detergent compositions.

Cotton soil release agents of the present invention are especially useful in conventional laundry detergent compositions such as those typically found in granular detergents or laundry bars. U.S. Pat. No. 3,178,370, Okenfuss, issued Apr. 13, 1965, describes laundry detergent bars and processes for making them. Philippine Patent 13,778, Anderson, issued Sep. 23, 1980, describes synthetic detergent laundry bars. Methods for making laundry detergent bars by various extrusion methods as well known in the art.

| Ingredients | Weight % |
|---|---|
| $C_{12}$ linear alkyl benzene sulfonate | 30 |
| Phosphate (as sodium tripolyphosphate) | 7 |
| Sodium carbonate | 25 |
| Sodium pyrophosphate | 7 |
| Coconut monoethanolamide | 2 |
| Zeolite A, (0.1–10 micron) | 5 |
| Carboxycellulose | 0.2 |
| Ethylenediamine disuccinate chelant (EDDS) | 0.4 |
| Polyacrylate (MW = 1400) | 0.2 |
| Nonanolyoxybenzenesulfonate | 5 |
| Soil release agent* | 0.5 |
| Non-cotton soil release agent** | 0.5 |
| Sodium percarbonate*** | 5 |
| Brightener, perfume | 0.2 |
| Protease | 0.3 |
| Calcium sulfate | 1 |
| Magnesium sulfate | 1 |
| Water | 4 |
| Filler**** | Balance to 100 |

*Soil release polymer according to Example 8.
**Non-cotton soil release agent according to U.S. Pat. No. 4,968,451, J. J. Scheibel and B. P. Gosselink, issued November 6, 1990 and disclosed herein above.
***Average particle size of 400 to 1200 microns.
****Can be selected from convenient materials such as Calcium carbonate, talc, clay, silicates, and the like.

The detergent bars are processed in conventional soap or detergent bar making equipment as commonly used in the art. The soil release agent is pulverized and admixed in an amount sufficient for use at a level of 0.5% by weight in conjunction with the detergent compositions.

Laundry bars suitable for hand-washing soiled fabrics are prepared by standard extrusion processes and comprise the following:

TABLE III

| Ingredients | weight % | |
|---|---|---|
| | 17 | 18 |
| LAS | 12 | 6 |
| Soap | 44 | 29 |
| Sodium tripolyphosphate | 5 | 5 |
| Sodium Carbonate | 4 | 6 |
| Optical brightener | 0.03 | 0 |
| Talc | 0 | 35.5 |
| Perfume | 0.45 | 0 |
| Sodium sulfate | 0.29 | 0 |
| Bentonite clay | 12.81 | 0 |
| Sodium chloride | 2 | 2 |
| Non-cotton soil release agent* | 0.5 | 0.5 |
| Soil release agent according to Example 7 | 0.5 | |
| Soil release agent according to Example 8 | | 0.5 |
| Other** | 0.42 | 1.5 |
| Water | balance | balance |

*According to U.S. Pat. No. 4,702,857, Gosselink, issued October 27, 1987 disclosed herein above.
**Can be selected from convenient materials such as Calcium carbonate, talc, clay, silicates, and the like.

TABLE IV

| Ingredients | weight % | | |
|---|---|---|---|
| | 20 | 21 | 22 |
| Sodium C$_{12}$–C$_{15}$ alcohol sulfate | 20.0 | — | — |
| Sodium linear alkylbenzene sulphonate | — | 20.0 | 20.0 |
| Sodium C$_{12}$–C$_{15}$ alcohol ethoxy (1.8) sulfate | 1.0 | — | — |
| Cationic surfactant[1] | 0.5 | 0.5 | — |
| Nonionic surfactant[2] | 0.63 | 0.63 | — |
| Polyamine[3] | 0.50 | 0.50 | 0.50 |
| Sodium carbonate | 25.0 | 17.0 | 25.0 |
| Builder[4] | 25.0 | 20.0 | 20.0 |
| Protease enzyme[5] | 0.70 | 0.70 | 0.70 |
| Protease enzyme[6] | 0.70 | — | 0.70 |
| Dispersant[7] | 1.0 | 1.0 | 2.0 |
| Soil release polymer[8] | 0.50 | 0.50 | 0.50 |
| Bleaching system[9] | 8.0 | — | 6.0 |
| Minors[10] | balance | balance | balance |

[1]Coconut trimethylammonium chloride.
[2]NEODOL 23-9 ex Shell Oil Co.
[3]4,9-dioxa-1,12-dodecanediamine, ethoxylated to average E20 per NH, quaternized to 90%, and sulfated to 90%.
[3]Zeolite A, hydrate (0.1–10 micron size).
[4]Bleach stable variant of BPN (Protease A-BSV) as disclosed in EP 130, 756 A January 9, 1985.
[5]Protease variants at position 103 of *Bacillus amyloliquefaciens* as described in WO9920727A1.
[6]Polyacrylate/maleate co-polymer.
[7]Soil release polymer according to U.S. Pat. No. 5,415,807 Gosselink et al., issued May 16, 1995.
[8]Bleaching system comprising NOBS (5%) and perborate (95%).
[9]Balance to 100% can, for example, include minors like optical brightener, perfume, suds suppresser, soil dispersant, chelating agents, dye transfer inhibiting agents, additional water, and fillers, including CaCO$_3$, talc, silicates, etc.

TABLE V

| Ingredients | weight % | | |
|---|---|---|---|
| | 23 | 24 | 25 |
| Sodium C$_{12}$–C$_{15}$ alcohol sulfate | 20.0 | 20.0 | 20.00 |
| Sodium C$_{12}$–C$_{15}$ alcohol ethoxy (1.8) sulfate | 1.0 | — | — |
| Cationic surfactant[1] | — | 0.50 | 0.50 |
| Polyamine[2] | 0.50 | 0.50 | 0.50 |
| Sodium carbonate | 30.0 | 20.0 | 25.0 |
| Builder[3] | 20.0 | 25.0 | 21.0 |
| Protease enzyme[4] | 0.70 | 0.70 | — |
| Protease enzyme[5] | 0.70 | 0.70 | 0.70 |
| Protease enzyme[6] | 1.0 | 1.0 | — |
| Dispersant[7] | 1.0 | — | 1.0 |
| Soil release polymer[8] | — | 0.50 | 0.50 |
| Bleaching system[9] | — | 5.5 | 6.2 |
| Minors[10] | balance | balance | balance |

[1]Coconut trimethylammonium chloride.
[2]4,9-dioxa-1,12-dodecanediamine, ethoxylated to average E20 per NH, quaternized to 90%, and sulfated to 90%.
[3]Zeolite A, hydrate (0.1–10 micron size).
[4]Bleach stable variant of BPN' (Protease A-BSV) as disclosed in EP 130, 756 A January 9, 1985.
[5]Protease variants at position 103 of *Bacillus amyloliquefaciens* as described in WO9920727A1.
[6]ALCALASE ® ex Novo.
[7]Polyacrylate/maleate co-polymer.
[8]Soil release polymer according to U.S. Pat. No. 5,415,807 Gosselink et al., issued May 16, 1995.
[9]Bleaching system comprising NOBS (5%) and perborate (95%).
[10]Balance to 100% can, for example, include minors like optical brightener, perfume, suds suppresser, soil dispersant, chelating agents, dye transfer inhibiting agents, additional water, and fillers, including CaCO$_3$, talc, silicates, etc.

What is claimed is:

1. A laundry detergent comprising:
   a) from about 0.01% by weight, of a surfactant system comprising one or more detersive surfactant selected from the group consisting of anionic, cationic, nonionic, zwitterionic, ampholytic surfactants, and mixtures thereof;
   b) from about 0.01% by weight of a water soluble or dispersible, modified polyamines which provides enhanced hydrophilic soil release benefits, comprising a polyamine backbone prior to modification corresponding to the formula:

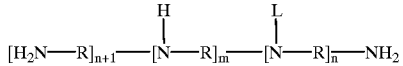

having a modified polyamine formula $V_{(n+1)}W_mY_nZ$, said polyamine backbone prior to modification having a molecular weight greater than about 200 daltons, wherein
   i) V units are terminal units which have the formula:

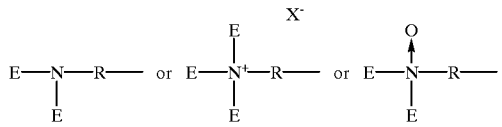

ii) W units are backbone units which have the formula:

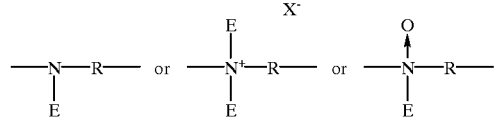

iii) Y units are branching units which have the formula:

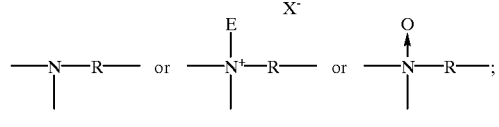

and iv) Z units are terminal units which have the formula:

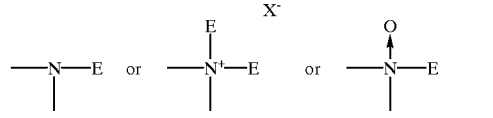

wherein L is a continuation of the backbone by branching, backbone linking R units are selected from the group consisting of
   i) C$_2$–C$_{12}$alkylene;
   ii) —(R$^1$O), R$^3$(OR$^1$)$_x$—;
   iii) —CH$_2$CH(OR—)CH$_2$—;
   iv) —[CH$_2$CH(OR$^2$)CH$_2$(T)$_r$]$_z$(R$^4$)[CH$_2$CH(OR$^2$)CH$_2$(T)$_r$]$_z$—
   v) —[CH$_2$CH(OR$^2$)CH$_2$(T)$_r$]$_z$(T)$_r$(R$^1$O)$_x$[CH$_2$CH(OR$^2$)CH$_2$(T)$_r$]$_z$(T)$_r$—
   vi) —[CH$_2$CH(OR$^2$)CH$_2$](T)$_r$[C(O)(T)$_r$R$^3$(T)$_r$C(O)$_x$](T)$_r$—[CH$_2$CH(OR$^2$)CH$_2$](T)$_r$—,
   vii) and mixtures thereof; wherein T is —O—, —NH—, and mixtures thereof; provided that when said backbone comprises a C$_2$–C$_{12}$alkylene R unit at least one other R unit comprises said backbone; R$^1$ is C$_2$–C$_{12}$alkylene, and mixtures thereof; R$^2$ is hydrogen, —$(R^1O)_xB$, and mixtures thereof; $R^3$ is $C_2$–$C_{12}$alkylene, $C_3$–$C_{12}$ hydroxyalkylene, $C_4$–$C_{12}$dihydroxyalkylene, $C_8$–$C_{12}$dialkylarylene, —C(O)—, —C(O)NHR$^5$NHC(O)—, $R^1(OR^1)$—, and mixtures thereof; $R^4$ is $C_2$–$C_{12}$alkylene, $C_4$–$C_{12}$alkenylene, $C_8$–$C_{12}$alkylarylene, $C_6$–$C_{10}$arylene, and mixtures thereof; $R^5$ is $C_2$–$C_{12}$alkylene or $C_6$–$C_{12}$arylene; E units are selected from the group consisting of:
i) hydrogen;
ii) $C_1$–$C_{12}$ linear or branched alkyl;
iii) $C_2$–$C_{12}$ linear or branched alkenyl;
iv) $C_6$–$C_{10}$aryl;
v) $C_7$–$C_{12}$alkylenearyl;
vi) —$(CH_2)_pCO_2M$;
vii) —$CH(CH_2CO_2M)CO_2M$;
viii) —$(CH_2)_qSO_3M$;
ix) —$(CH_2)_qCH(SO_2M)CH_2SO_3M$;
x) —$(CH_2)_qCH(SO_3M)CH_2SO_3M$;
xi) —$(CH_2)_pPO_3M$;
xii) —$(R^1O)_xB$;
provided when any E unit of a nitrogen is a hydrogen, said nitrogen is not also an N-oxide; B is selected from the group consisting of:
i) hydrogen;
ii) —$(CH_2)_pCO_2M$;
iii) —$CH(CH_2CO_2M)CO_2M$;
iv) —$(CH_2)_qSO_3M$;
v) —$(CH_2)_qCH(SO_2M)CH_2SO_3M$;
vi) —$(CH_2)_qCH(SO_3M)CH_2SO_3M$;
vii) —$(CH_2)_pPO_3M$;
viii) and mixtures thereof;
M is hydrogen or a water soluble cation in sufficient amount to satisfy charge balance; X is a water soluble anion; k has the value from 0 to about 20; m has the value from 0 to about 400; n has the value from 0 to about 200; p has the value from 1 to 6, q has the value from 0 to 6; r has the value 0 or 1; w has the value 0 or 1; x has the value from 1 to 100; y has the value from 0 to 100; z has the value from 0 to 6; and
c) the balance carriers and adjunct ingredients.

2. A composition according to claim 1 wherein said polyamine backbone R units have the formula:

—$(R^1O)_xR^3(OR^1)_x$— wherein $R^1$ $C_3$—$C_6$alkylene; $R^3$ is $C_2$–$C_6$alkylene, and x is from 2 to 6.

3. A composition according to claim 2 wherein said polyamine backbone has the formula:

$H_2N$—$CH_2CH_2CH_2OCH_2CH_2CH_2CH_2OCH_2CH_2CH_2$—$NH_2$.

4. A composition according to claim 1 wherein said E units are hydrogen, —$(R^1O)_xB$, —$(CH_2)_qSO_3M$, —$(CH_2)_pCO_2M$, and mixtures thereof, $R^1$ is ethylene, 1,2-propylene, and mixtures thereof; B is hydrogen, —$(CH_2)_qSO_3M$, —$(CH_2)_pCO_2M$; M, p, q, and x are the same as defined herein above.

5. A composition according to claim 4 wherein E units are —$(R^1O)_xB$, B is hydrogen or —$(CH_2)_qSO_3M$, $R^1$ is ethylene, q is 0 or 1, x is from 15 to 25.

6. A composition according to claim 1 wherein said polyamine has at least one backbone nitrogen which is a quaternized nitrogen.

7. A composition according to claim 6 wherein E units are $C_1$–$C_4$ linear or branched alkyl, —$(R^1O)_xB$, B is hydrogen or —$(CH_2)_qSO_3M$, $R^1$ is ethylene, q is 0 or 1, x is from 15 to 25.

8. A composition according to claim 7 wherein greater than about 50% of said backbone nitrogens are quaternized and at least one E unit on said quaternized backbone nitrogens is methyl.

9. A composition according to claim 8 wherein at least 90% of said backbone nitrogens are quaternized.

10. A composition according to claim 1 wherein said dispersible polyamine has the formula:

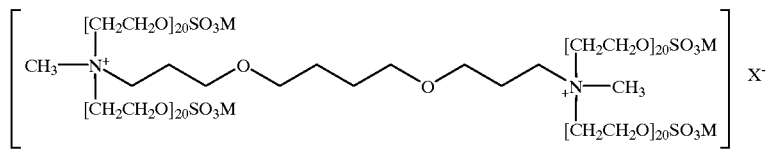

wherein M is a hydrogen or a water soluble cation, and X is an anion of sufficient charge or sufficient amount to provide electronic neutrality.

11. A composition according to claim 1 wherein said dispersible polyamine has the formula:

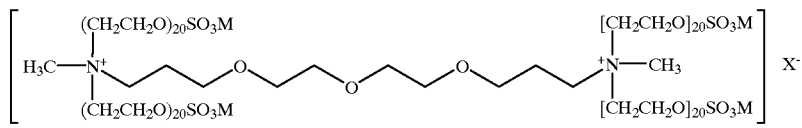

wherein M is a hydrogen or a water soluble cation, and X is an anion of sufficient charge or sufficient amount to provide electronic neutrality.

12. A composition according to claim 1 comprising a one or more dispersible polyamines wherein at least 90% of the backbone nitrogens are quaternized and at least 50% of the backbone hydrogens are substituted with an alkyleneoxy sulphate unit having the formula:

—$(R^1O)_xSO_3M$ wherein $R^1$ is ethylene, 1,2-propylene, and mixtures thereof; M is a water soluble cation; x has an average value of from 15 to 25.

13. A composition according to claim 12 wherein at least 70% of said backbone hydrogens are substituted with an alkyleneoxy sulphate unit.

14. A composition according to claim 13 wherein at least 90% of said backbone hydrogens are substituted with an alkyleneoxy sulphate unit.

15. A composition according to claim 2 wherein said polyamine backbone has the formula:

16. A composition according to claim 1 further comprising from about 1% by weight, of a peroxygen bleaching system comprising:
   i) from about 40% by weight, of the bleaching system, a source of hydrogen peroxide;
   ii) optionally from about 0.1% by weight, of the beaching system, a beach activator;
   iii) optionally from about 1 ppb of the composition, of a transition-metal bleach catalyst; and
   iv) optionally from about 0.1% by weight, of a pre-formed peroxygen bleach agent.

17. A composition to claim 1 wherein the adjunct ingredients are selected from the group consisting of builders, optical brighteners, bleaches, bleach boosters, bleach activators, soil release polymers, dye transfer agents, dispersents, enzymes, suds suppressors, dyes, perfumes, colorants, filler salts, hydrotropes, and mixtures thereof.

* * * * *